(12) United States Patent
Nanba

(10) Patent No.: US 6,931,207 B2
(45) Date of Patent: Aug. 16, 2005

(54) ZOOM LENS SYSTEM AND CAMERA HAVING THE SAME

(75) Inventor: Norihiro Nanba, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/744,335

(22) Filed: Dec. 23, 2003

(65) Prior Publication Data

US 2004/0161228 A1 Aug. 19, 2004

(30) Foreign Application Priority Data

Dec. 27, 2002 (JP) ........................................ 2002-380155
May 6, 2003 (JP) ........................................ 2003-128262

(51) Int. Cl.$^7$ .............................. G03B 5/00; G02B 15/14
(52) U.S. Cl. ...................... 396/72; 348/240.3; 359/687; 359/690
(58) Field of Search .................... 396/72; 348/240.3; 359/687, 690

(56) References Cited

U.S. PATENT DOCUMENTS

| 4,632,519 A | 12/1986 | Takahashi | 359/687 |
| 4,709,997 A | 12/1987 | Terasawa | 359/689 |

(Continued)

FOREIGN PATENT DOCUMENTS

| JP | 6-43363 | 2/1994 | G02B/15/16 |
| JP | 8-50244 | 2/1996 | G02B/15/20 |
| JP | 8-248317 | 9/1996 | G02B/15/16 |
| JP | 9-5624 | 1/1997 | G02B/15/00 |
| JP | 10-62687 | 3/1998 | G02B/15/20 |
| JP | 11-305124 | 11/1999 | G02B/15/16 |
| JP | 2000-321499 | 11/2000 | G02B/15/20 |
| JP | 2001-194586 | 7/2001 | G02B/15/00 |
| JP | 2001-194590 | 7/2001 | G02B/15/20 |
| JP | 2001-242379 | 9/2001 | G02B/15/20 |
| JP | 2001-350093 | 12/2001 | G02B/15/20 |
| JP | 2001-356269 | 12/2001 | G02B/15/20 |
| JP | 2002-062478 | 2/2002 | G02B/15/20 |

OTHER PUBLICATIONS

English abstract for JP 2000321499 A.
English abstract for JP 8248317 A.
English abstract for JP 2001194590 A.
English abstract for JP 9005624 A.
English abstract for JP 8050244 A.
English abstract for JP 2001194586 A.
English abstract for JP 2001242379 A.
English abstract for JP 2001356269 A.
English abstract for JP 11305124 A.
English abstract for JP 10062687 A.
English abstract for JP application No. 03–198777, publication No. 05–019163.
English abstract for JP application No. 05–176164, publication No. 07–013079.
English abstract for JP application No. 58–074539, publication No. 59–198416.
English abstract for JP 2002062478 A.
English abstract for JP 2001350093 A.
English abstract for JP 6043363 A.

*Primary Examiner*—W. B. Perkey
(74) *Attorney, Agent, or Firm*—Morgan & Finnegan, LLP

(57) ABSTRACT

A zoom lens system with a new structure is disclosed which realizes high optical performance by appropriately setting the structure of each lens unit and using a material with anomalous dispersion in an appropriate lens unit. Specifically, according to several aspect herein disclosed, the zoom lens system includes, in order from an object side to an image side, lens units having a positive, a negative, and a positive optical powers in which the structure of each lens unit is specified or a third lens unit employs a lens element made of a material with anomalous dispersion.

42 Claims, 23 Drawing Sheets

U.S. PATENT DOCUMENTS

| | | | |
|---|---|---|---|
| 4,789,226 A | * 12/1988 | Ogata | 359/687 |
| 5,257,134 A | 10/1993 | Sugawara | 359/679 |
| 5,600,490 A | * 2/1997 | Sugawara et al. | 359/690 |
| 5,715,087 A | * 2/1998 | Sato | 359/557 |
| 5,760,966 A | 6/1998 | Tanaka et al. | 359/683 |
| 6,016,228 A | 1/2000 | Uzawa | 359/687 |
| 6,166,864 A | 12/2000 | Horiuchi | 359/687 |
| 6,404,561 B1 | 6/2002 | Isono et al. | 359/683 |
| 6,414,799 B1 | 7/2002 | Uzawa et al. | 359/687 |
| 6,449,433 B2 | 9/2002 | Hagimori et al. | 396/72 |
| 6,456,441 B2 | 9/2002 | Hoshi | 359/687 |
| 6,594,087 B2 | 7/2003 | Uzawa et al. | 359/685 |
| 2003/0165020 A1 | 9/2003 | Satori et al. | 359/686 |

* cited by examiner

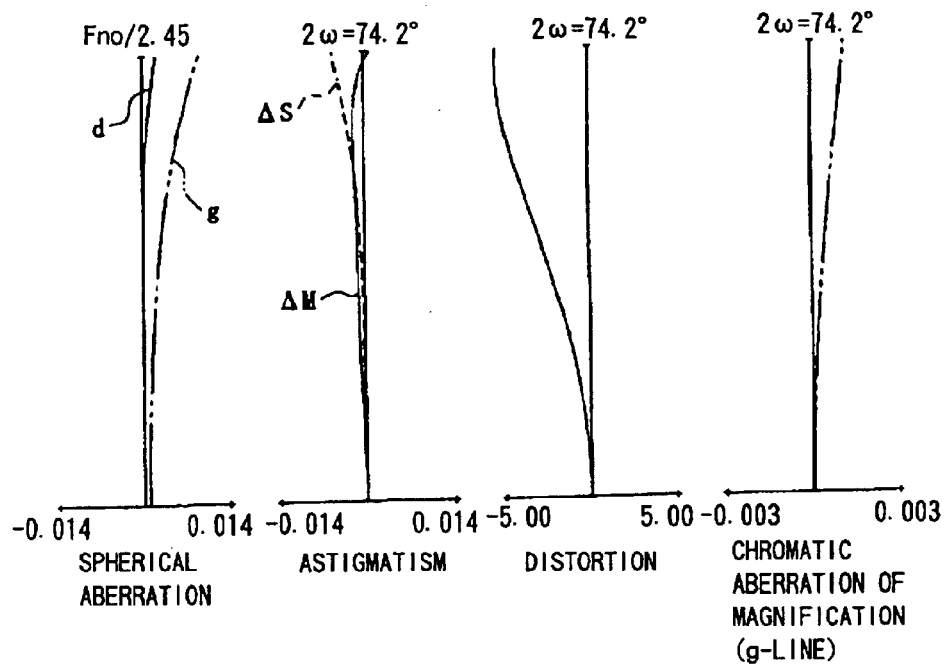
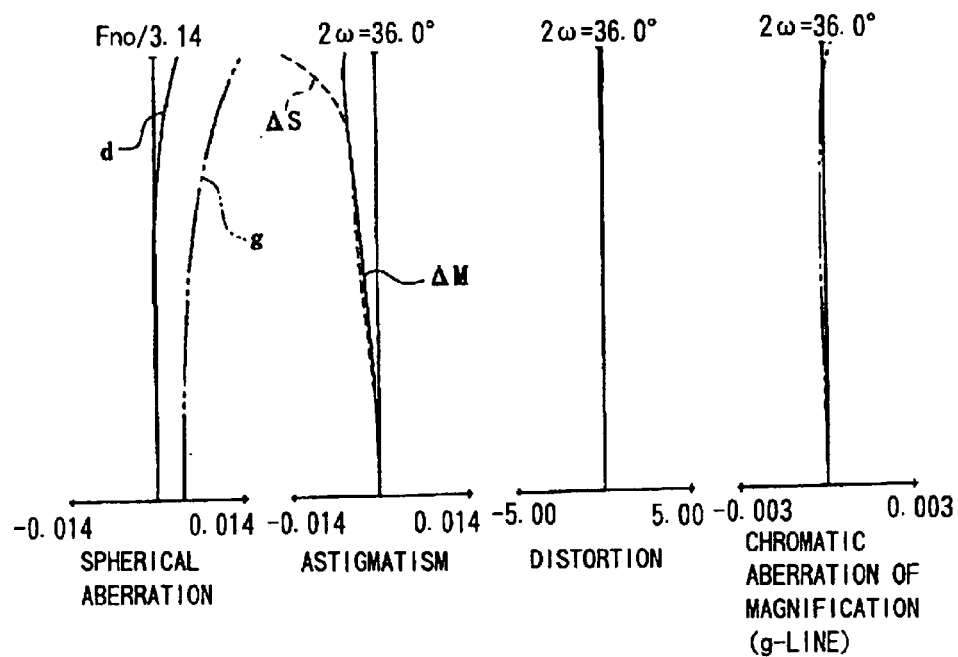

ZOOM LENS SYSTEM AND CAMERA HAVING THE SAME

BACKGROUND OF THE INVENTION

1. Field of the Invention

The present invention relates to a zoom lens system preferable for use in a digital still camera, a video camera or the like.

2. Description of Related Art

A known zoom lens which has a first lens unit having a positive refractive power, a second lens unit having a negative refractive power, a third lens unit having a positive refractive power, and a fourth lens unit having a positive refractive power in order from an object side achieves zooming by moving the first, second, third, and fourth lens units (for example, see Patent Documents 1 to 3).

Another known zoom lens has a four lens unit structure as described above including a third lens unit formed to have a plurality of lenses disposed with a large air spacing (for example, see Patent Documents 4, 5).

In addition, a known zoom lens of a rear focus type achieves focusing by moving lens units other than a first lens unit on an object side as a means for realizing reductions in overall length of the zoom lens and a front element diameter (Patent Documents 6, 7).

Generally, in the zoom lens of the rear focus type, the effective diameter of a first lens unit can be reduced as compared with a zoom lens which achieves focusing by moving a first lens unit, so that the size of the overall lens system can be easily reduced. Also, close-up, especially image-taking at the closest focusing distance is easily performed. Since small and lightweight lens units are moved, only a small driving force is needed for the lens units to allow fast focusing.

(Patent Document 1)
  Japanese Patent Application Laid-Open No. H08(1996)-50244
(Patent Document 2)
  U.S. Pat. No. 4,632,519
(Patent Document 3)
  Japanese Patent Application Laid-Open No. 2001-194586 (corresponding to U.S. Pat. No. 6,456,441)
(Patent Document 4)
  Japanese Patent Application Laid-Open No. 2001-242379
(Patent Document 5)
  Japanese Patent Application Laid-Open No. 2001-356269
(Patent Document 6)
  Japanese Patent Application Laid-Open No. H11(1999)-305124 (corresponding to U.S. Pat. No. 6,166,864)
(Patent Document 7)
  Japanese Patent Application Laid-Open No. H10(1998)-62687 (corresponding to U.S. Pat. No. 6,016,228)

In a zoom lens disclosed in Japanese Patent Application Laid-Open No. H08(1996)-50244, a third lens unit is formed of a single positive lens in which the effect of variable magnification is partially provided by moving the third lens unit. When a high zoom ratio is provided, variations in aberration of the third lens present a problem.

In U.S. Pat. No. 4,632,519, the zoom ratio is approximately 5.7. The spacing between a third lens unit and a fourth lens unit becomes smaller from the wide-angle end to the telephoto end to reduce the action of variable magnification provided by the third lens unit. Especially for a high zoom ratio of 6 or more, the overall length of the zoom lens is increased at the telephoto end to present a problem in terms of a reduction in size.

In Japanese Patent Application Laid-Open Nos. 2001-242379 and 2001-356269, the variable magnification ratio is approximately 3, and a first lens unit is formed of a single positive lens. Thus, when a higher zoom ratio is provided, variations in aberration occurring in the first lens unit during variation of magnification are not easily canceled by the other lens units.

On the other hand, in a camera such as a video camera and a digital still camera, a solid-state image-pickup device with a number of pixels (a multi-pixel image-pickup device) is often used. A high-performance zoom lens is required as an optical system for use in such a camera.

It is necessary, especially for a zoom lens for a multi-pixel image-pickup device, not only to correct monochromatic aberration but also to sufficiently correct chromatic aberration in a wide wavelength range. Generally, when a zoom lens with a high zoom ratio has a large focal length of the overall system at a zoom position on the telephoto side, a reduced secondary spectrum is highly demanded in chromatic aberration in addition to primary achromatism.

Conventionally, a number of zoom lenses have been known which employ a lens made of glass with anomalous dispersion to correct a secondary spectrum of axial chromatic aberration (longitudinal chromatic aberration) at a zoom position on the telephoto side. In addition, as a structure of a zoom lens suitable for providing a high zoom ratio, a positive lead type zoom lens is an example which includes a lens unit having a positive refractive power closest to an object.

A known zoom lens has a three lens unit structure with a positive, a negative, and a positive refractive powers in order from an object side in which a lens made of glass with anomalous dispersion is used (For example, Patent Documents 8 to 10).

Another known zoom lens has a four lens unit structure with a positive, a negative, a positive, and a positive refractive powers in order from an object side in which a lens made of glass with anomalous dispersion is used (For example, Patent Documents 11 to 15).

Another known zoom lens has a five lens unit structure with a positive, a negative, a positive, a negative, and a positive refractive powers in order from an object side in which a lens made of glass with anomalous dispersion is used (For example, Patent Documents 12, 15 to 17).
(Patent Document 8)
  Japanese Patent No. 3008580 (corresponding to U.S. Pat. No. 5,257,134)
(Patent Document 9)
  Japanese Patent Application Laid-Open No. H06(1994)-43363
(Patent Document 10)
  Japanese Patent Publication No. H03(1991)-58490 (corresponding to U.S. Pat. No. 4,709,997)
(Patent Document 11)
  Japanese Patent No. 3097399
(Patent Document 12)
  Japanese Patent Application Laid-Open No. 2002-62478 (corresponding to U.S. Pat. No. 6,594,087)
(Patent Document 13)
  Japanese Patent Application Laid-Open No. 2000-321499 (corresponding to U.S. Pat. No. 6,414,799)
(Patent Document 14)
  Japanese Patent Application Laid-Open No. H08(1996)-248317
(Patent Document 15)
  Japanese Patent Application Laid-Open No. 2001-194590 (corresponding to U.S. Pat. No. 6,404,561)

(Patent Document 16)

Japanese Patent Application Laid-Open No. H09(1997)-5624 (corresponding to U.S. Pat. No. 5,760,966)

(Patent Document 17)

Japanese Patent Application Laid-Open No. 2001-350093 (corresponding to U.S. Pat. No. 6,449,433)

In the positive lead type zoom lens, the secondary spectrum of axial chromatic aberration at a zoom position on the telephoto side is likely to occur in the first lens unit having a positive refractive power in which the height of axial rays is high. Thus, the positive lens of the first lens unit is often made of glass with anomalous dispersion to reduce the secondary spectrum. However, the glass with anomalous dispersion is typically difficult to process as compared with normal glass, and especially when it is used for the first lens unit having a large effective diameter, it is difficult to provide a lens with high processing accuracy.

In a zoom lens formed of three lens units having a positive, a negative, and a positive refractive powers in order from an object side, the height of axial rays is high in the third lens unit, so that a significant effect of correcting the secondary spectrum of axial chromatic aberration is achieved by using glass with anomalous dispersion for a material of a positive lens of the third lens unit. This is advantageous in manufacture since the third lens unit has a smaller lens effective diameter than a first lens unit.

In Patent Documents 14, 15, and 17, a first lens unit having a positive refractive power includes a lens made of glass with anomalous dispersion. However, a third lens unit has no lens made of glass with anomalous dispersion, and correction of chromatic aberration is not necessarily sufficient.

In Patent Document 13, a fourth lens unit has a lens made of glass with anomalous dispersion, but any of a first lens unit and a third lens unit has no lens made of glass with anomalous dispersion. The lens made of the glass with anomalous dispersion in the fourth lens unit effectively reduces the secondary spectrum of chromatic aberration of magnification (lateral chromatic aberration). The zoom ratio in an embodiment is approximately 4, but when the zoom ratio is increased, correction of the axial secondary spectrum is not necessarily sufficient on the telephoto side.

Generally, in a zoom lens having a three lens unit structure with a positive, a negative, and a positive refractive powers in order from an object side or having a four lens unit structure, the lens arrangement in which a first lens unit is moved during variation of magnification is suitable for reducing the overall length of the zoom lens at the wide-angle end at a high zoom ratio of 7 or more.

In Patent Documents 8 to 11 and 16 described above, however, the first lens unit is fixed during variation of magnification. Thus, it is difficult to achieve both of a smaller overall length of the zoom lens and high variable magnification.

In Patent Documents 10 and 11, each of a first lens unit and a third lens unit employs a lens made of lens with anomalous dispersion to favorably correct chromatic aberration. However, the first lens unit employs the lens, so that the lens tends to have a large effective diameter to cause difficulty in manufacturing the lens.

In Patent Document 11, since an aperture stop is provided in the fourth lens unit, the diameter of a front element is increased when the focal length at the wide-angle end is reduced to obtain a wider angle. In each embodiment of Patent Document 11, half of the field angle at the wide-angle end is as narrow as 16.7 degrees to make the lens inappropriate for specifications including half of the field angle larger than 30 degrees.

Generally, the use of a number of lenses made of a glass material with high anomalous dispersion is effective in enhancing the effect of correcting the secondary spectrum. A particularly effective glass material has an Abbe number larger than 90 and a partial dispersion ratio $\Theta g, F$ lager than 0.53 (for example, fluorite). In any of the conventional examples, such a glass material with high anomalous dispersion is not used. Thus, the correction of the secondary spectrum is not sufficient when the number of pixels is increased to cause a smaller pitch in a solid-state image-pickup device in a digital camera or the like.

SUMMARY OF THE INVENTION

It is an object of the present invention to provide a zoom lens system with a new structure which is different from those in the aforementioned conventional examples. The present invention realizes a zoom lens system which has favorable optical performance by appropriately setting the structure of each lens unit and using a material with anomalous dispersion in an appropriate lens unit.

BRIEF DESCRIPTION OF THE DRAWINGS

FIG. 32 shows various types of aberration in the zoom lens of Numerical Example 8 at the wide-angle end;

FIG. 33 shows various types of aberration in the zoom lens of Numerical Example 8 at the intermediate zoom position;

DETAILED DESCRIPTION OF THE PREFERRED EMBODIMENTS

Preferred embodiments of a zoom lens system and a camera having the zoom lens system according to the present invention are hereinafter described with reference to the drawings.

(Embodiment 1)

Figure 1:
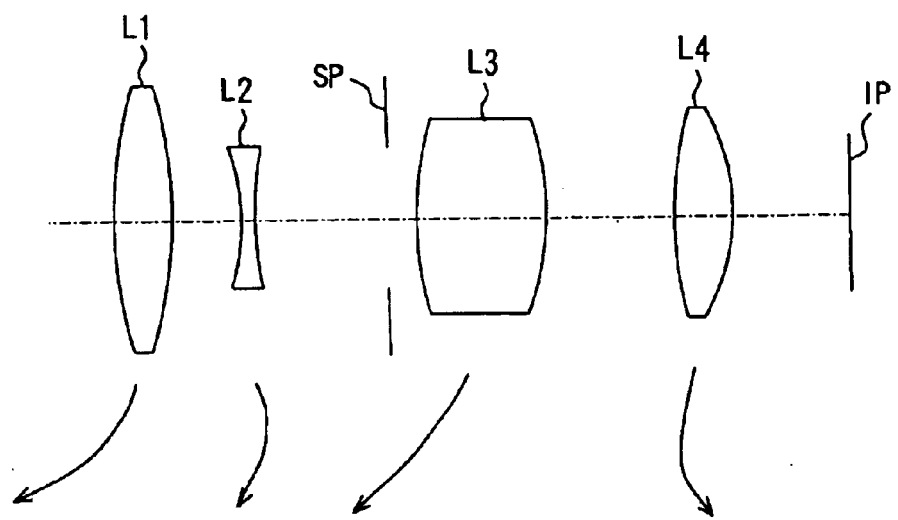
FIG. 1 is an explanatory view of a paraxial refractive power arrangement in a zoom lens of Embodiment 1 according to the present invention.
Figure 2:
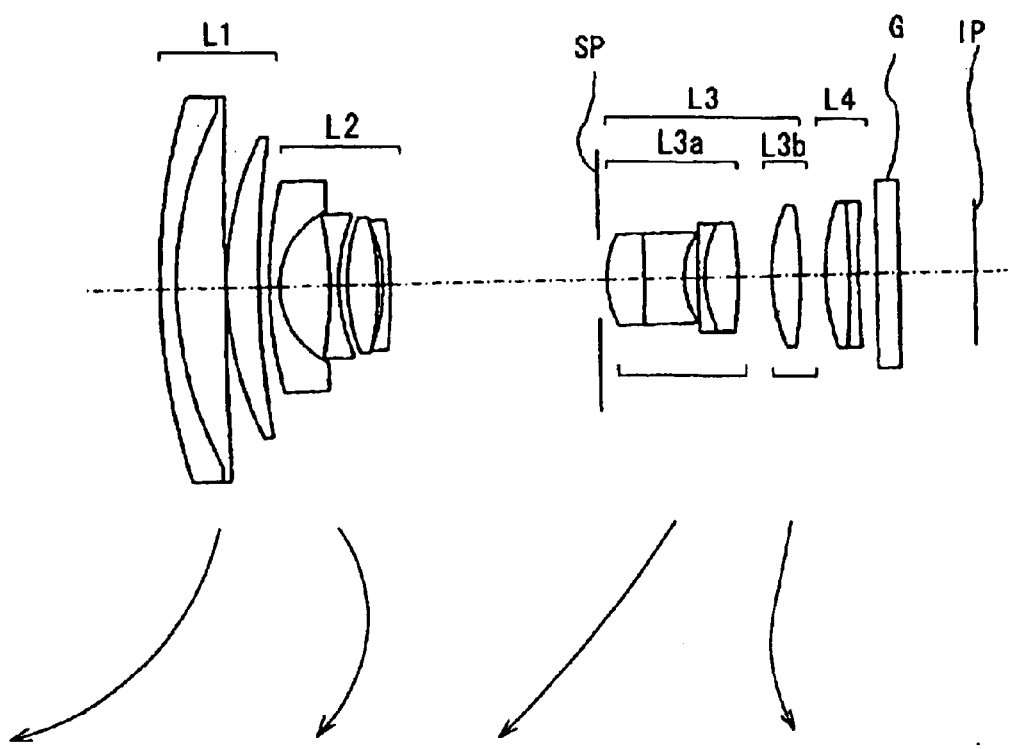
FIG. 2 is a section view of a zoom lens of Numerical Example 1 at the wide-angle end.
Figure 3:
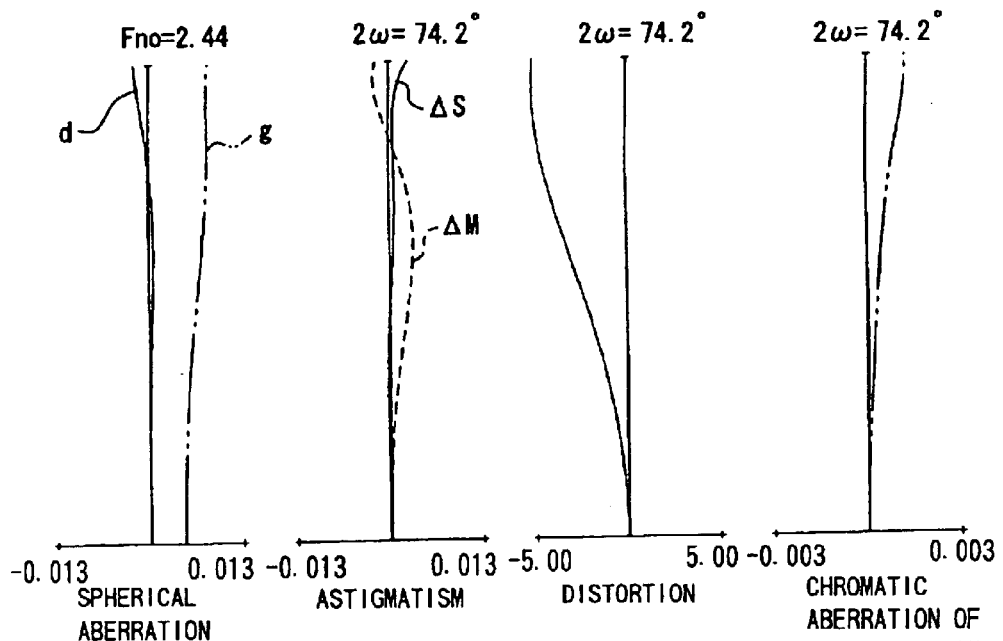
FIG. 3 shows various types of aberration in the zoom lens of Numerical Example 1 at the wide-angle end.
Figure 4:
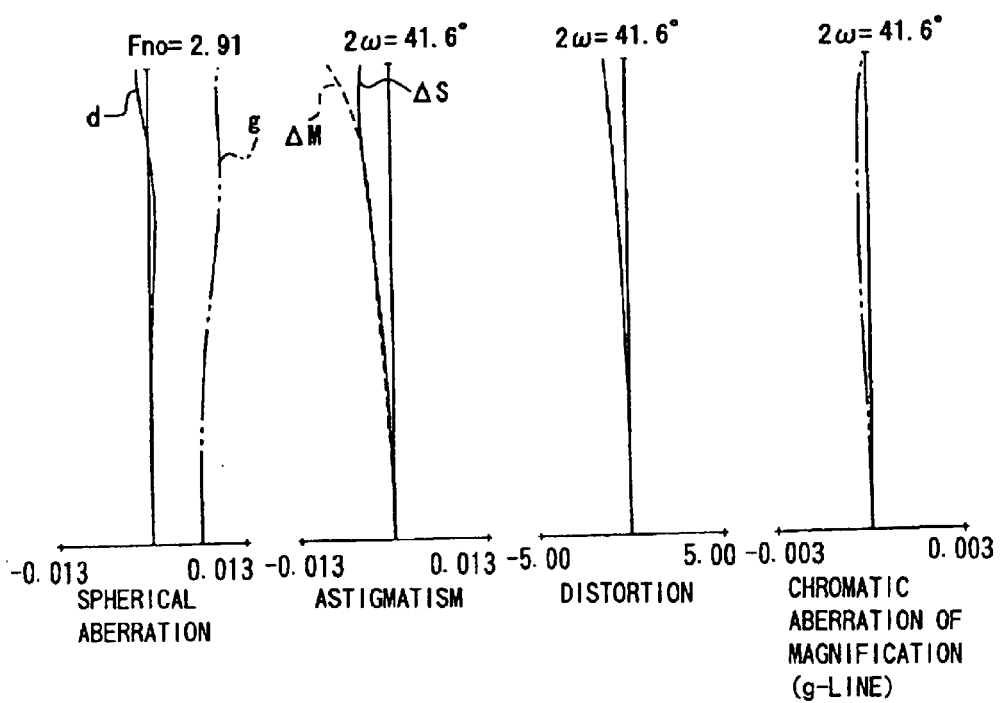
FIG. 4 shows various types of aberration in the zoom lens of Numerical Example 1 at the intermediate zoom position.
Figure 5:
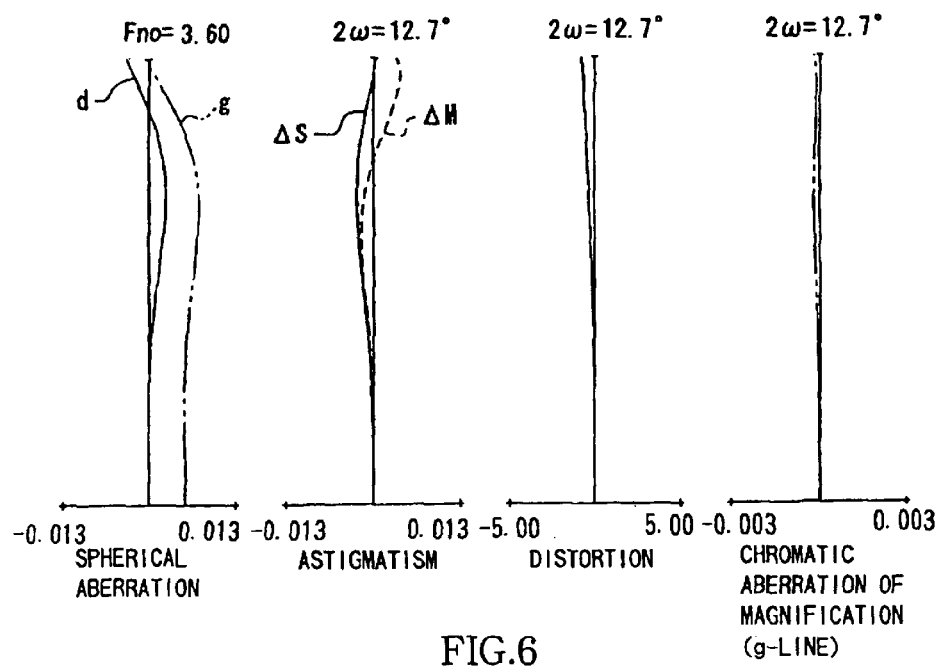
FIG. 5 shows various types of aberration in the zoom lens of Numerical Example 1 at the telephoto end.

FIG. 1 is an explanatory view of a paraxial refractive power arrangement in a zoom lens of Embodiment 1 corresponding to Numerical Examples 1 to 5, later described. FIG. 2 is a section view of main portions of a zoom lens of Numerical Example 1. FIGS. 3 to 5 show various types of aberration at the wide-angle end, intermediate focal length, and telephoto end of the zoom lens of Numerical Example 1.

Figure 6:
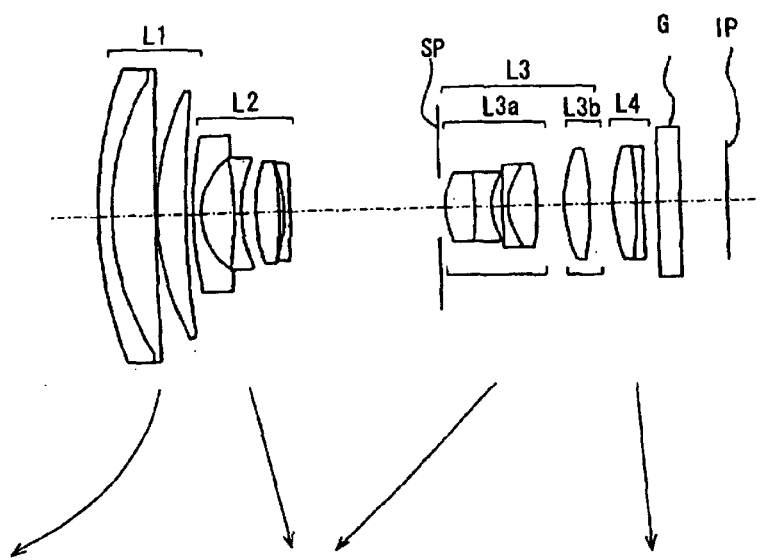
FIG. 6 is a section view of a zoom lens of Numerical Example 2 at the wide-angle end.
Figure 7:
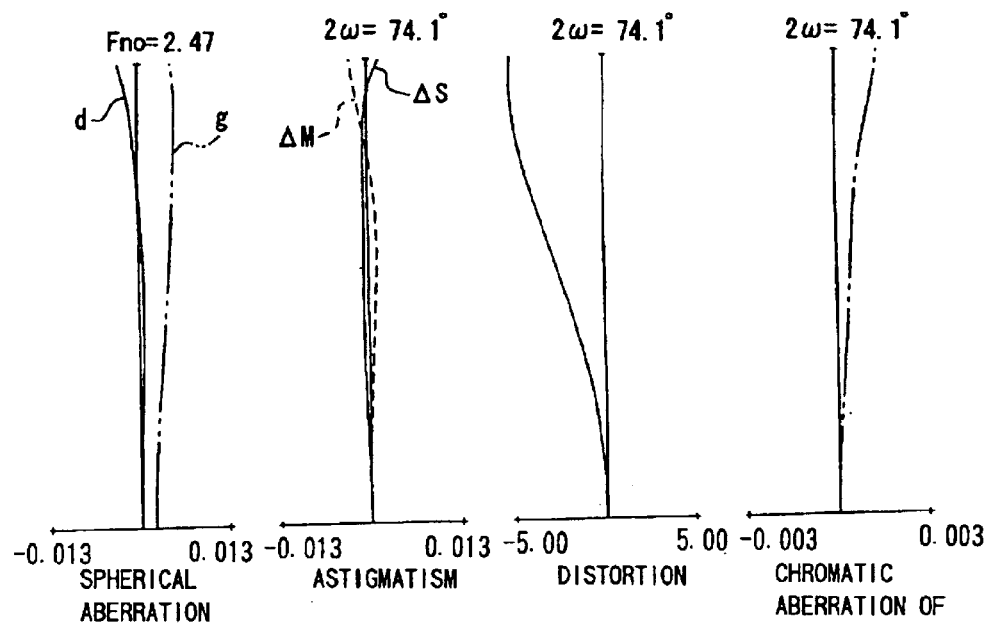
FIG. 7 shows various types of aberration in the zoom lens of Numerical Example 2 at the wide-angle end.
Figure 8:
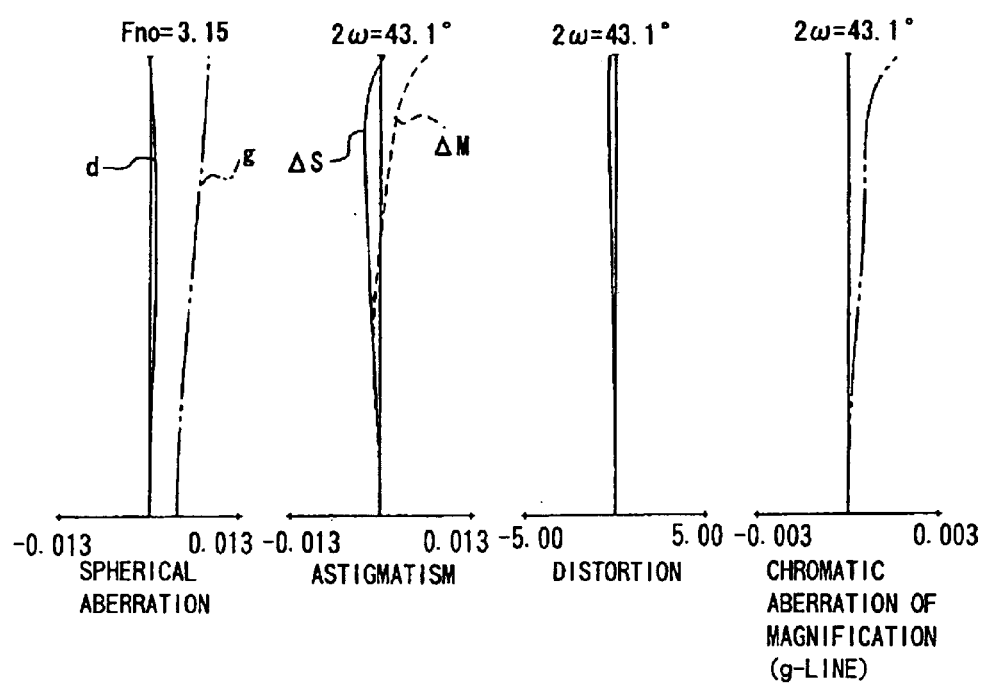
FIG. 8 shows various types of aberration in the zoom lens of Numerical Example 2 at the intermediate zoom position.
Figure 9:
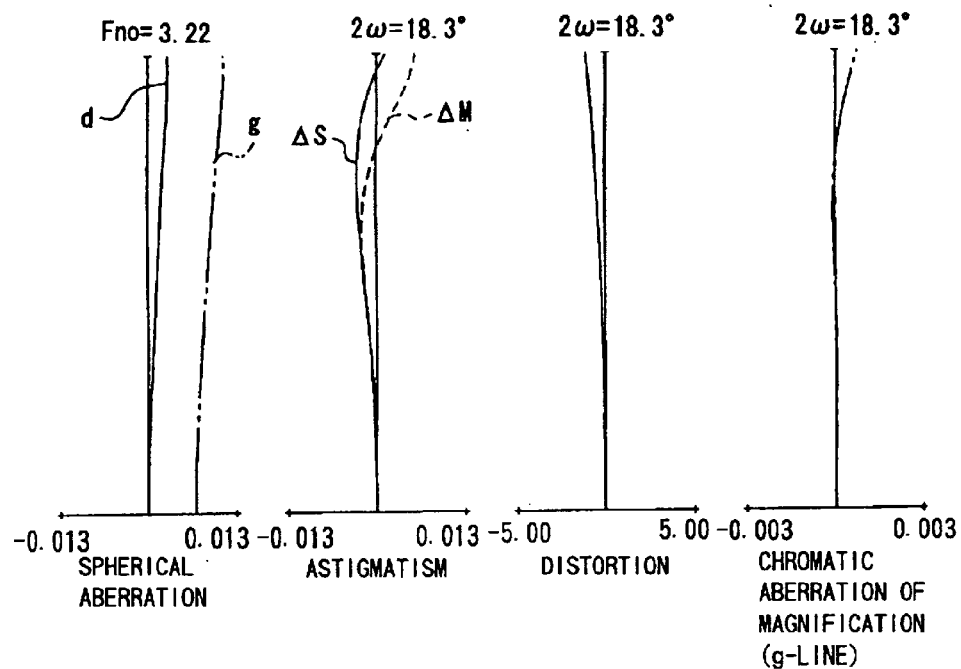
FIG. 9 shows various types of aberration in the zoom lens of Numerical Example 2 at the telephoto end.

FIG. 6 is a section view of main portions of a zoom lens of Numerical Example 2. FIGS. 7 to 9 show various types of aberration at the wide-angle end, intermediate focal length, and telephoto end of the zoom lens of Numerical Example 2.

Figure 10:
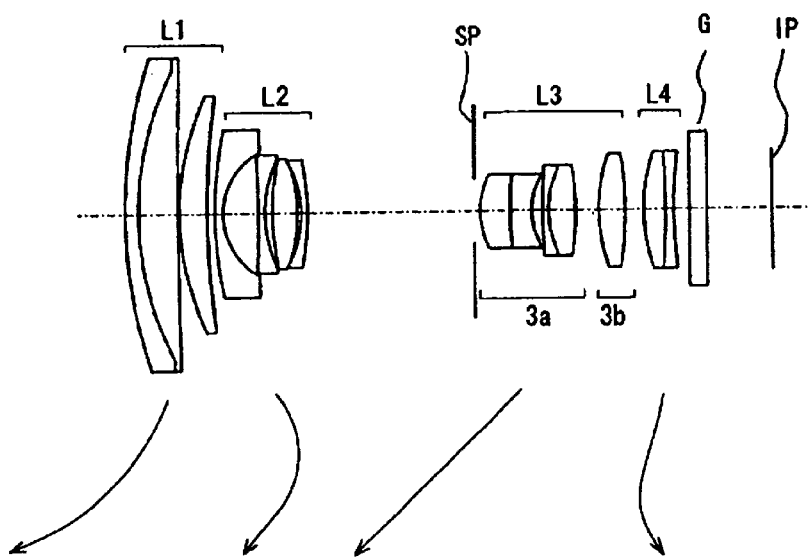
FIG. 10 is a section view of a zoom lens of Numerical Example 3 at the wide-angle end.
Figure 11:
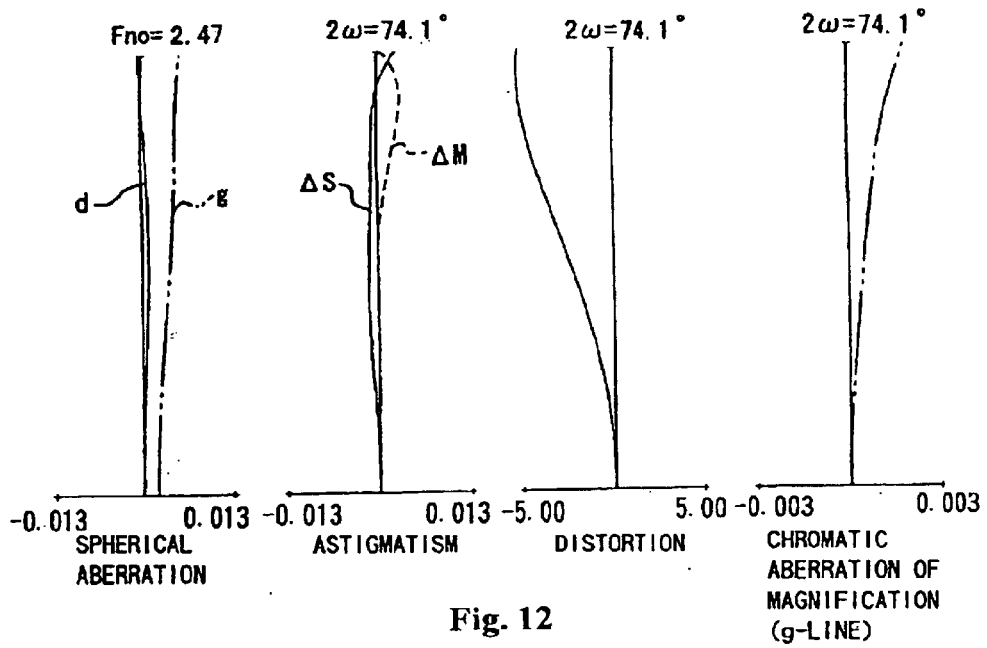
FIG. 11 shows various types of aberration in the zoom lens of Numerical Example 3 at the wide-angle end.
Figure 12:
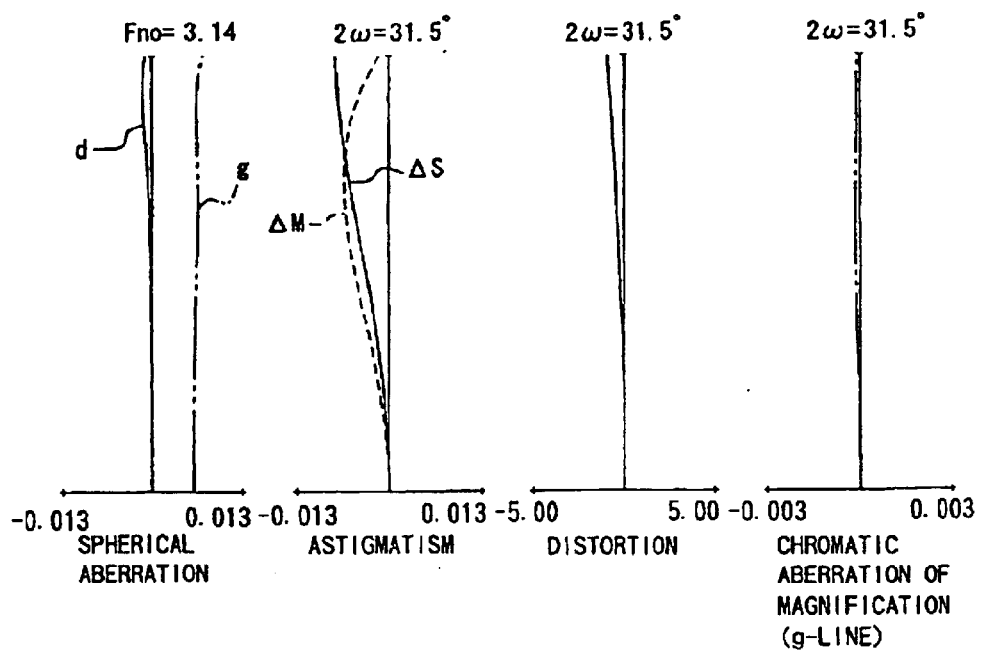
FIG. 12 shows various types of aberration in the zoom lens of Numerical Example 3 at the intermediate zoom position.
Figure 13:
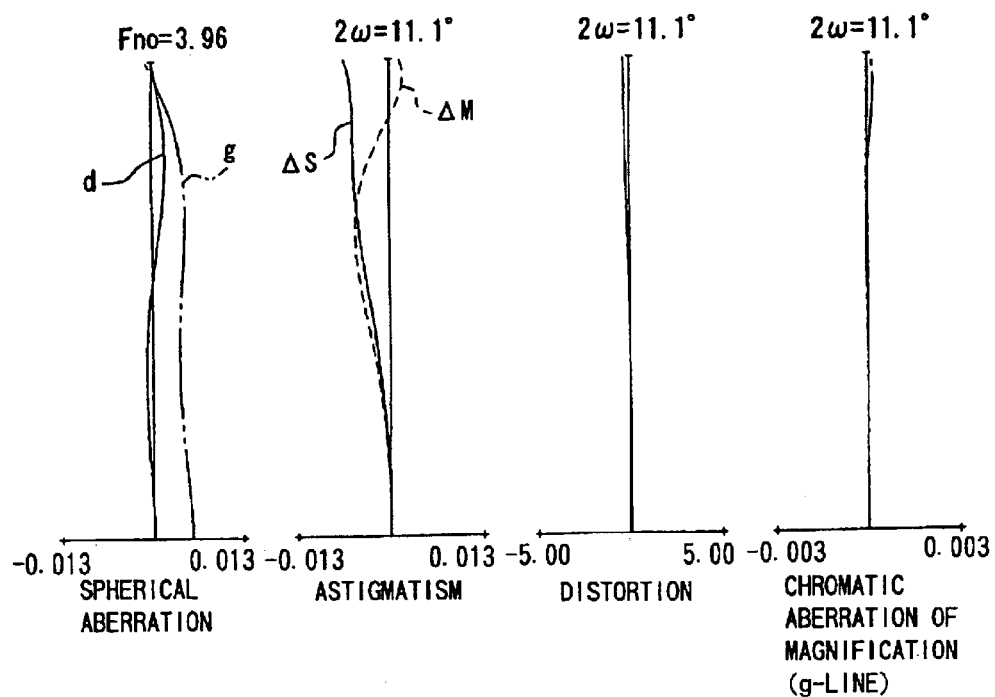
FIG. 13 shows various types of aberration in the zoom lens of Numerical Example 3 at the telephoto end.

FIG. 10 is a section view of main portions of a zoom lens of Numerical Example 3. FIGS. 11 to 13 show various types of aberration at the wide-angle end, intermediate focal length, and telephoto end of the zoom lens of Numerical Example 3.

Figure 14:
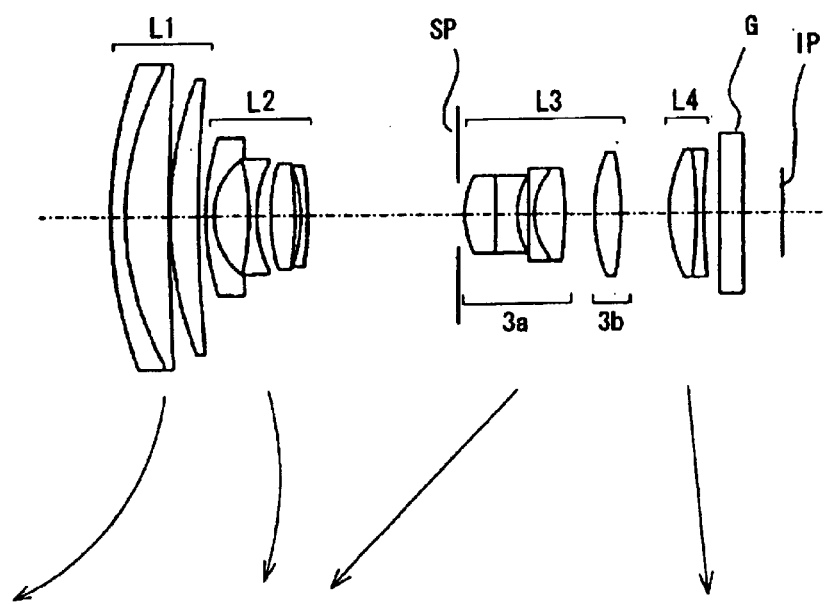
FIG. 14 is a section view of a zoom lens of Numerical Example 4 at the wide-angle end.
Figure 15:
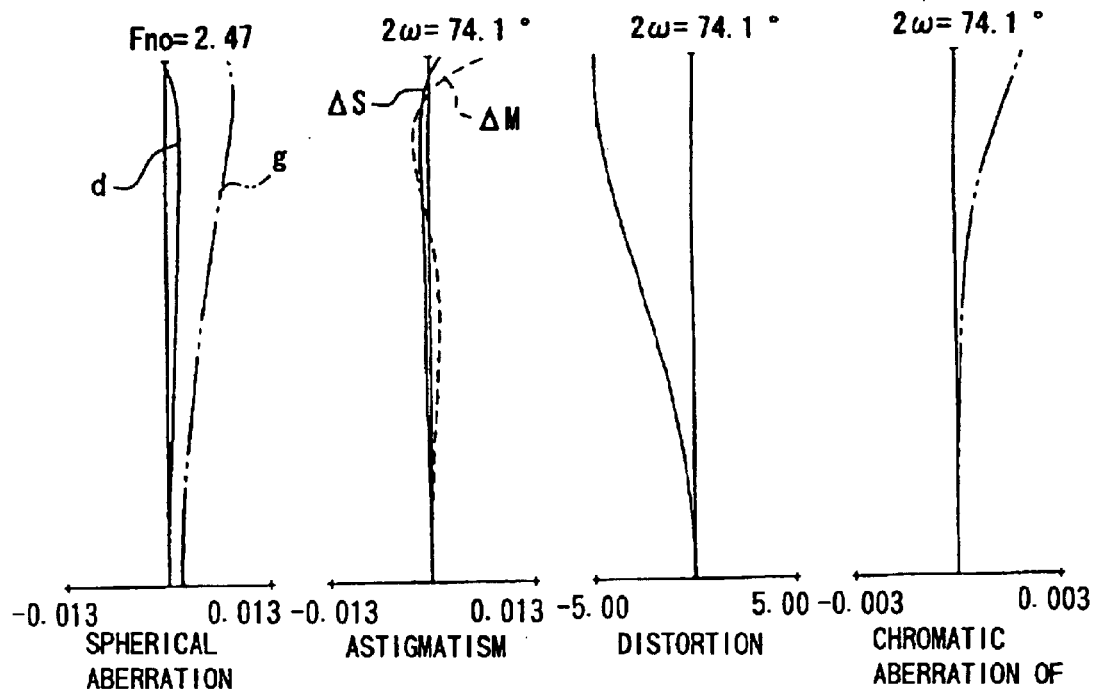
FIG. 15 shows various types of aberration in the zoom lens of Numerical Example 4 at the wide-angle end.
Figure 16:
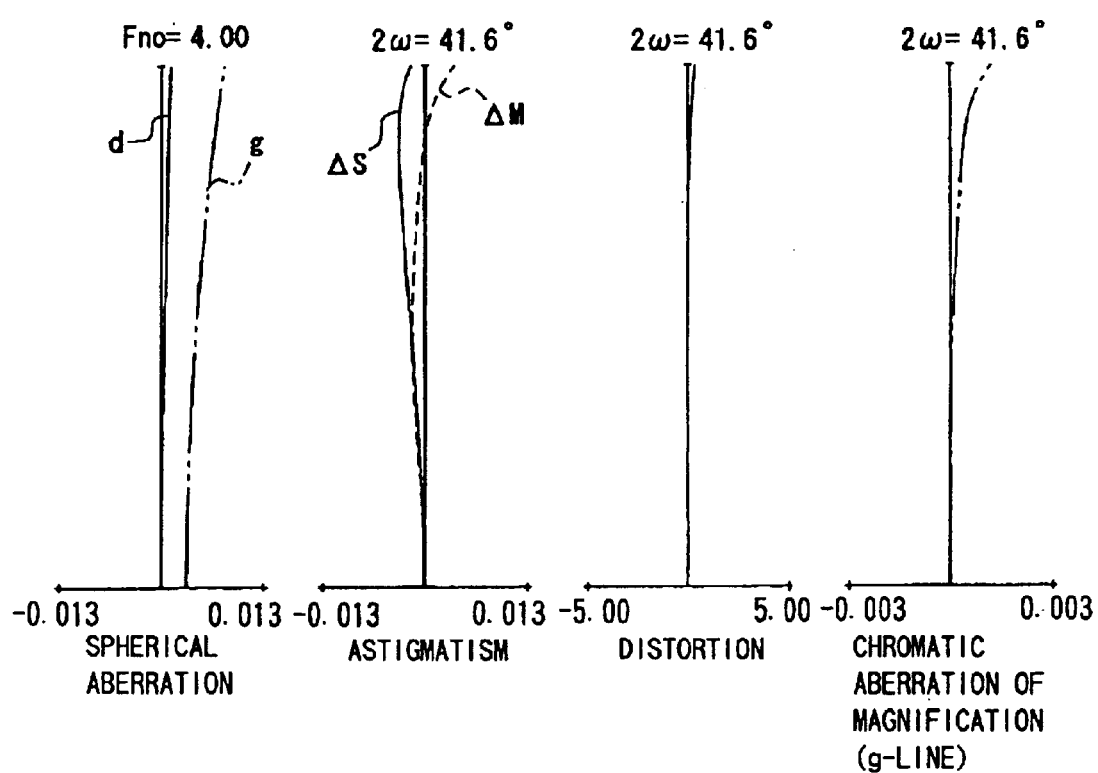
FIG. 16 shows various types of aberration in the zoom lens of Numerical Example 4 at the intermediate zoom position.
Figure 17:
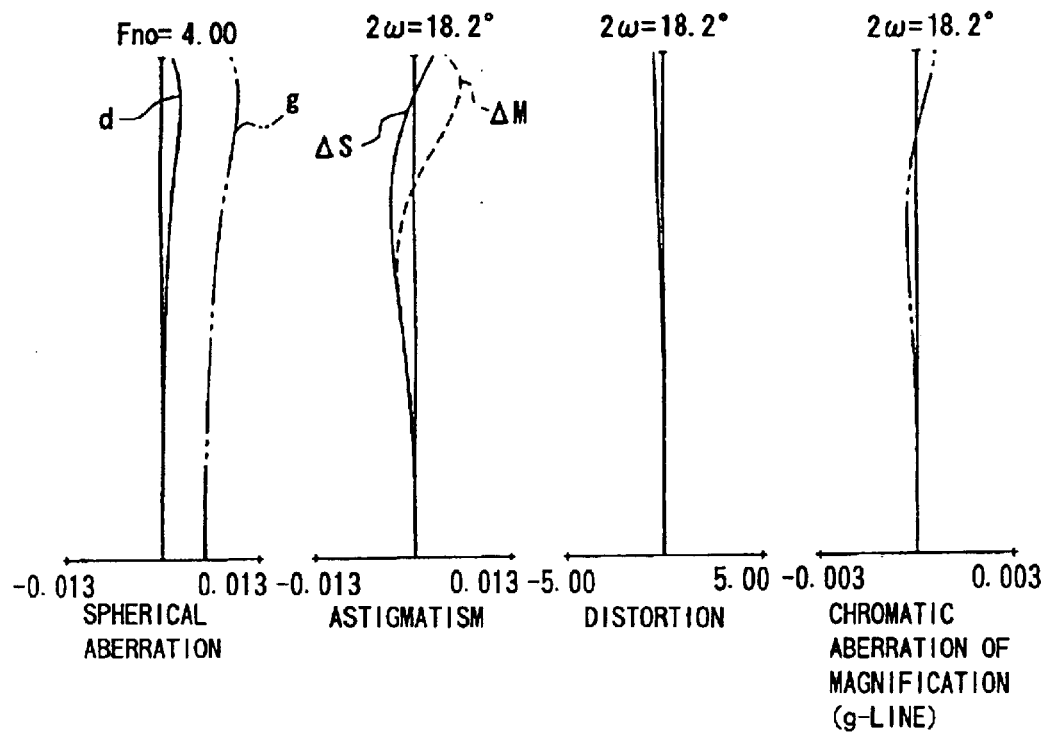
FIG. 17 shows various types of aberration in the zoom lens of Numerical Example 4 at the telephoto end.

FIG. 14 is a section view of main portions of a zoom lens of Numerical Example 4. FIGS. 15 to 17 show various types of aberration at the wide-angle end, intermediate focal length, and telephoto end of the zoom lens of Numerical Example 4.

Figure 18:
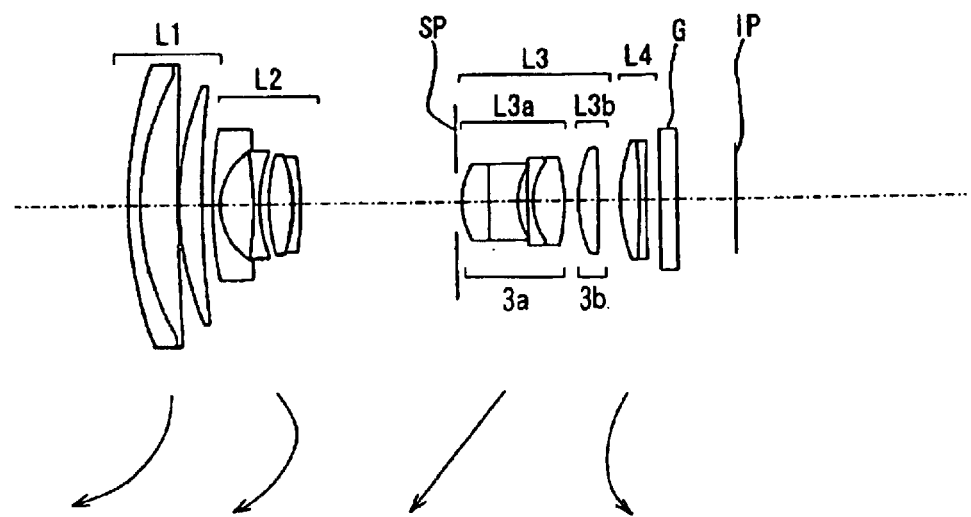
FIG. 18 is a section view of a zoom lens of Numerical Example 5 at the wide-angle end.
Figure 19:
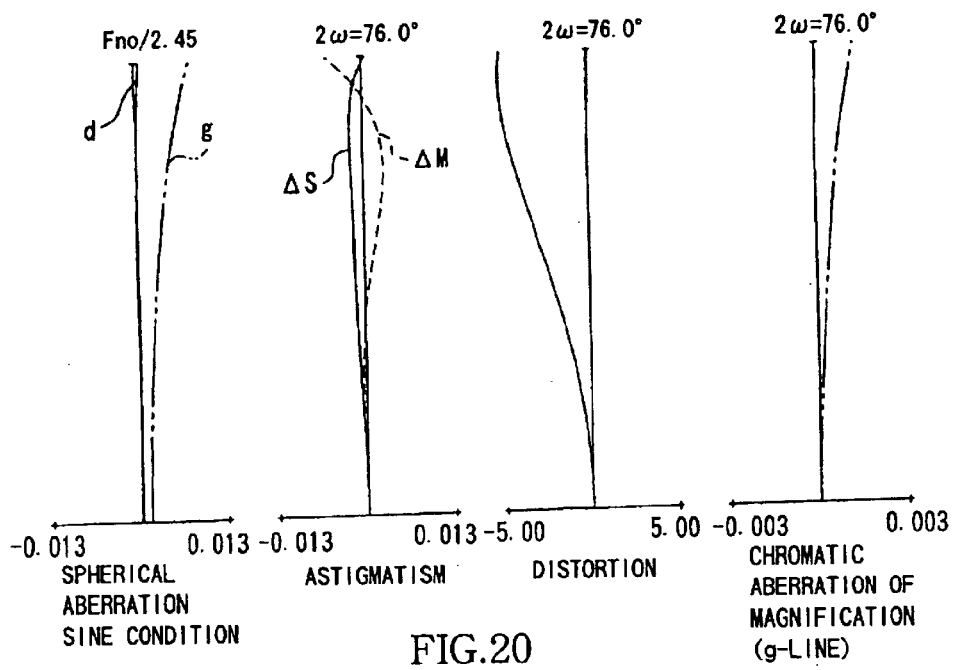
FIG. 19 shows various types of aberration in the zoom lens of Numerical Example 5 at the wide-angle end.
Figure 20:
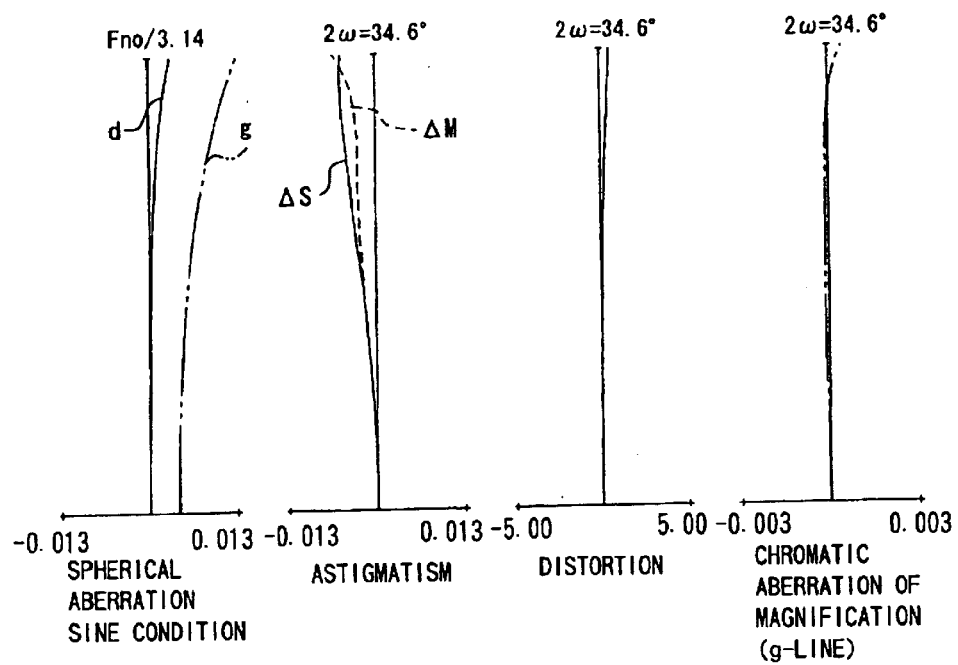
FIG. 20 shows various types of aberration in the zoom lens of Numerical Example 5 at the intermediate zoom position.
Figure 21:
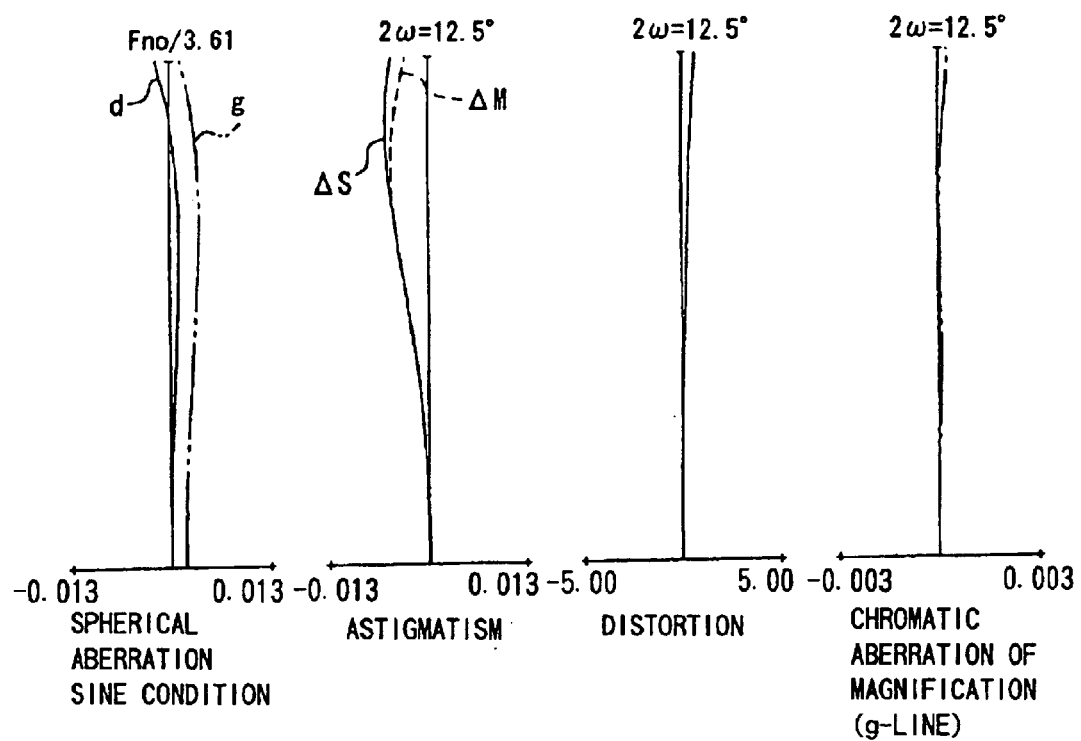
FIG. 21 shows various types of aberration in the zoom lens of Numerical Example 5 at the telephoto end.

FIG. 18 is a section view of main portions of a zoom lens of Numerical Example 5. FIGS. 19 to 21 show various types of aberration at the wide-angle end, intermediate focal length, and telephoto end of the zoom lens of Numerical Example 5.

In the section view of each zoom lens, L1 shows a first lens unit having a positive refractive power (an optical power or the reciprocal of a focal length) and L2 shows a second lens unit having a negative refractive power. L3 shows a third lens unit having a positive refractive power which has a first lens sub-unit L3a having a positive refractive power and a second lens sub-unit L3b having a positive refractive power with the largest air spacing between them. L4 shows a fourth lens unit having a positive refractive power. SP shows an aperture stop located in front of the third lens unit L3. G shows an optical block which corresponds to an optical filter, a faceplate or the like and is provided in design. IP shows an image plane at which an image-pickup surface of a solid-state image-pickup device (a photoelectrical conversion element) such as a CCD sensor and a CMOS sensor is located.

In each aberration diagram, d and g show a d-line and a g-line, respectively. ΔM and ΔS show a meridional image plane and a sagittal image plane, respectively. The chromatic difference of magnification is represented by the g-line.

In the zoom lens of Embodiment 1, the respective lens units are moved as shown by arrows in zooming from the wide-angle end to the telephoto end. The wide-angle end and the telephoto end refer to zoom positions when lens units for varying magnification are positioned at two ends of a mechanically movable range in an optical axis direction, respectively.

The respective lens units are moved in zooming such that the spacing between the first lens unit L1 and the second lens unit L2 is larger, the spacing between the second lens unit L2 and the third lens unit L3 is smaller, and the spacing between the third lens unit L3 and the fourth lens unit L4 is larger at the telephoto end than at the wide-angle end.

Specifically, in zooming from the wide-angle end to the telephoto end, the first lens unit L1 is moved towards an object along part of a convex track towards an image. The movement of the first lens unit L1 in zooming can reduce the overall length of the zoom lens at the wide-angle end to achieve a reduction in size in the optical axis direction. In addition, the smaller spacing between the first lens unit L1 and the aperture stop SP at the wide-angle end reduces the effective diameter of the first lens unit L1 to realize a reduction in diameter of the front element.

The second lens unit L2 is moved along a convex track towards the image or linearly towards the image.

The third lens unit L3 is moved towards the object from the wide-angle end to the telephoto end, and the moving track is set such that the spacing between the third lens unit L3 and the fourth lens unit L4 is larger at the telephoto end than at the wide-angle end to cause the third lens unit L3 to make a contribution to the variable magnification action. This can diminish the variable magnification action provided by changing the spacing between the first lens unit L1 and the second lens unit L2, so that it is possible to set a smaller spacing between the first lens unit L1 and the second lens unit L2 at the telephoto end. Consequently, the overall length of the zoom lens is reduced at the telephoto end and the diameter of the front element is reduced.

The aperture stop SP may be moved together with the third lens unit L3 or may be moved separately from the third lens unit L3 during zooming. If the aperture stop SP is moved together with the third lens unit L3, the number of movable lens units can be reduced to facilitate simplification of the mechanical structure. If the aperture stop SP is moved separately from the third lens unit L3, the diameter of the front element can be easily reduced especially when the aperture stop SP is moved along a convex track towards the object.

The fourth lens unit L4 is moved along a convex track towards the object or moved towards the image to correct image plane variations associated with variations of magnification.

In Embodiment 1, the first lens sub-unit L3a consists of two positive lenses and two negative lenses. Specifically, the third lens unit L3 is formed, in order from the object side to the image side, a first cemented lens formed by cementing a positive lens having a convex surface towards the object side to a negative lens having a concave surface towards the image, a second cemented lens formed by cementing a negative lens to a positive lens, and a positive lens. A part system of the third lens unit L3 consisting of the first and second cemented lenses constitutes the first lens sub-unit L3a, and the other part of the third lens unit L3 consisting the remaining single positive lens constitutes the second lens sub-unit L3b. The first lens sub-unit L3a is spaced from the second lens sub-unit L3b to some degree to locate the second lens sub-unit L3b away from the aperture stop SP.

When the aperture stop SP is moved during zooming, the exit pupil easily varies. Especially when the aperture stop SP is moved towards the object side in zooming from the wide-angle end to the telephoto end the exit pupil is likely to vary from negative to positive. Thus, the second lens sub-unit L3b is disposed close to the fourth lens unit L4 at the wide-angle end to cause the combination system of the second lens sub-unit L3b and the fourth lens unit L4 to have the action of locating the exit pupil away from the image plane. At the telephoto end, the third lens unit L3 is moved towards the object to locate the second lens sub-unit L3b away from the image plane, and the fourth lens unit L4 is mainly responsible for the action of locating the exit pupil away from the image plane. The action of locating the exit pupil away from the image plane by the second lens sub-unit L3b is particularly provided at a zoom position on the wide-angle side in this manner to cancel variations in the exit pupil due to the movement of the aperture stop SP. As a result, variations in the exit pupil are small even when the aperture stop SP is moved during zooming. When the zoom lens is applied to an image-taking apparatus which employs a solid-state image pickup device having a microlens arranged in each pixel, shading can be reduced over the entire zoom range.

The first lens sub-unit L3a is formed of the two cemented lenses to favorably correct various types of aberration. When the third lens unit L3 is moved to make a contribution to variable magnification, it is necessary to satisfactorily correct various types of aberration occurring in the third lens unit L3 including variations due to variations of magnification. If the third lens unit L3 has a lateral magnification close to one, well-balanced correction can be made to various types of aberration by forming the first lens sub-unit L3a in a symmetric form. A triplet is a representative example of a symmetric lens arrangement. In Embodiment 1, the negative and positive refractive powers of the triplet are divided into two components to increase flexibility in correction of aberration, thereby more favorably correcting various types of aberration such as spherical aberration, comatic aberration, and curvature of field.

In addition, the first lens unit L1 is formed to include at least one positive lens and negative lens to reduce variations in chromatic aberration during zooming. If two or more positive lenses may be included to share the refractive power, it is possible to reduce spherical aberration on the telephoto side and an axial secondary spectrum.

In an optical system which requires-high resolution such as an image-taking lens for a digital camera or a video camera employing a multi-pixel solid-state image-pickup device, variations in chromatic aberration of magnification associated with variations of magnification need to be sufficiently corrected. Thus, the second lens unit L2 is formed to include three or more negative lenses and one or more positive lenses.

When only two negative lenses are included, correction of chromatic aberration of magnification is difficult if the refractive power of the second lens unit L2 is increased to reduce the moving amounts of the first lens unit L1 and the second lens unit L2 in an attempt to reduce the overall length of the zoom lens. The second lens unit L2 is formed of, in order from the object side, a meniscus negative lens having a concave surface towards the image, a negative lens, a positive lens having a convex surface towards the object, and a negative lens to reduce symmetry of a front side and a rear side of the second lens unit L2. This enhances the achromatism effect at the principal point to effectively correct chromatic aberration of magnification.

In Embodiment 1, the fourth lens unit L4 or the second lens sub-unit L3b is used to achieve focusing. When the fourth lens unit L4 is used for focusing, the relatively small and lightweight lens unit is moved as compared with front focusing, so that only a small driving power is required. In addition, it is compatible with an autofocus system due to the ability to perform fast focusing.

When the second lens sub-unit L3b is used for focusing, an additional mechanism is required for driving. However, as compared with the case where the fourth lens unit L4 is used for focusing, the spacing between the second lens sub-unit L3b and the fourth lens unit L4 can be reduced at the wide-angle end to achieve a reduction in the overall length of the zoom lens. In addition, while no image is taken, a collapsible mechanism can be used to reduce the spacing between the lens units, thereby realizing a smaller size of the whole image-taking apparatus. When the second lens sub-unit L3b has a moving mechanism, the second lens sub-unit L3b is moved towards the object and collapsed in that state to allow a further reduction in the collapsed lens length.

When the zoom lens in Embodiment 1 is applied to an image-taking apparatus, an optical filter in a flat shape may be disposed between the first lens sub-unit L3a and the second lens sub-unit L3b. This arrangement advantageously improves the use of the spacing between the first lens sub-unit L3a and the second lens sub-unit L3b to eliminate the need to provide additional space for disposing a filter. As the optical filter, an ND filter for reducing an amount of light, an infrared cut filter for absorbing or reflecting light in the near-infrared region or the like can be used. Any of the filters may be fixed between the first lens sub-unit L3a and the second lens sub-unit. L3b, or may be removably provided on the optical path. The ND filter is typically disposed near the aperture stop SP, but the filter disposed between the first lens sub-unit L3a and the second lens sub-unit L3b is advantageous in reducing the overall length of the zoom lens since the spacing between the second lens unit L2 and the third lens unit L3 can be reduced accordingly at the telephoto end zoom position. The infrared cut filter is typically disposed between an image-taking lens and a solid-state image-pickup device, but the filter disposed between the first lens sub-unit L3a and the second lens sub-unit L3b can reduce the effective range of rays to achieve smaller outer dimensions of the filter. Especially when the filter is removably provided, the overall image-taking apparatus can be reduced in size. Since the rays passing between the first lens sub-unit L3a and the second lens sub-unit L3b are relatively close to be afocal, the insertion or removal of the filter involves small variations in focus.

In Embodiment 1, the following conditions are satisfied:

$$(0.6 \times D3b) < d < D3a \quad (1)$$

$$0.7 < f3b/f3a < 1.3 \quad (2)$$

$$1.0 < f1/ft < 2.5 \quad (3)$$

$$0.01 < d23/ft < 0.20 \quad (4)$$

$$0.5 < (\beta 3t/\beta 3w)/(\beta 2t/\beta 2w) < 1.0 \quad (5)$$

$$60 < \nu 3b \quad (6)$$

where D3a represents a distance on the optical axis from a lens surface closest to the object to a lens surface closest to the image in the first lens sub-unit L3a, D3b a distance on the optical axis from a lens surface closest to the object to a lens surface closest to the image in the second lens sub-unit L3b, d an air spacing between the first lens sub-unit L3a and the second lens sub-unit L3b, f3a and f3b focal lengths of the first lens sub-unit L3a and the second lens sub-unit L3b, respectively, f1 a focal length of the first lens unit L1, ft a focal length of the entire system at the telephoto end, d23 a spacing between a lens surface of the second lens unit L2 closest to the image and the lens surface of the third lens unit L3 closest to the object at the telephoto end (a spacing between the second lens unit L2 and the third lens unit L3 at the telephoto end), $\beta 2w$ and $\beta 3w$ lateral magnifications of the second lens unit L2 and the third lens unit L3 at the wide-angle end, respectively, $\beta 2t$ and $\beta 3t$ lateral magnifications of the second lens unit L2 and the third lens unit L3 at the telephoto end, respectively, and $\nu 3b$ an Abbe number of the material of the single positive lens of the second lens sub-unit L3b.

It is necessary only that at least one of the conditions is satisfied. The effect in association with the satisfied expression can be provided.

Next, each of the conditions is described from a technical viewpoint.

The conditional expression (1) defines the spacing between the first lens sub-unit L3a and the second lens sub-unit L3b. A large spacing between the first lens sub-unit L3a and the second lens sub-unit L3b, which exceeds the upper limit, is not preferable since the third lens unit L3 is moved in the optical axis direction to increase the overall length of the zoom lens. On the other hand, a smaller spacing than the lower limit is not preferable since such a small spacing diminishes the action of locating the second lens sub-unit L3b away from the image plane to reduce variations in the exit pupil during zooming.

The conditional expression (2) defines the ratio of the refractive powers of the first lens sub-unit L3a and the second lens sub-unit L3b. If the focal length of the second lens sub-unit L3b is so large relative to the focal length of the first lens sub-unit L3a as to result in the value of f3b/f3a larger than the upper limit, that is, if the refractive power of the second lens sub-unit L3b is too low relative to the refractive power of the first lens sub-unit L3a, the action of bending off-axis luminous flux is extremely small. Thus, such a large focal length is not preferable since the action of locating the exit pupil away from the image plane at the wide-angle end is diminished even when first lens sub-unit L3a is spaced from the second lens sub-unit L3b to some degree. If the refractive power of the second lens sub-unit L3b is so high relative to the refractive power of the first lens unit L3a as to result in the value of f3b/f3a less than the lower limit, the second lens sub-unit L3b must make a larger contribution to the variable magnification action in the third lens L3, and it is difficult for the second lens sub-unit L3b formed of only one lens to correct aberration. Especially the Petzval sum is too large, and correction of curvature of field is difficult.

The conditional expression (3) defines the focal length of the first lens unit L1. If the focal length of the first lens unit L1 is so large as to result in the value of f1/ft exceeding the upper limit, that is, if the refractive power of the first lens unit L1 is too low, the overall length of the zoom lens is too large especially at the telephoto end. On the other hand, if the focal length of the first lens unit L1 is so small as to result in the value of f1/ft less than the lower limit, that is, if the refractive power of the first lens unit L1 is too high, spherical aberration is unpreferably increased at the telephoto end.

The conditional expression (4) defines the distance between the second lens unit L2 and the third lens unit L3 at the telephoto end. A long distance between the units L2 and L3, which causes the value of d23/ft to exceed the upper limit, is not preferable since the overall length of the zoom lens is long at the telephoto end and the spacing between the aperture stop SP and the first lens unit L1 is increased at the telephoto end to result in an increased diameter of the front element. If the distance is so short as to cause the value of d23/ft to be less than the lower limit, it is difficult to dispose the aperture stop unit between the second lens unit L2 and the third lens unit L3.

The conditional expression (5) defines the contribution to variable magnification of the second lens unit L2 and the third lens unit L3. If the contribution to variable magnification of the third lens unit L3 is so large relative to the second lens unit L2 as to result in the value of $(\beta 3t/\beta 3w)/(\beta 2t/\beta 2w)$ exceeding the upper limit, the third lens unit L3 involves large variations in aberration such as spherical aberration, comatic aberration, and astigmatism during variation of magnification to cause difficulty in achieving favorable optical performance over the entire zoom range. On the other hand, a small contribution to variable magnification of the third lens unit L3 relative to the second lens unit L2, which causes the value of $(\beta 3t/\beta 3w)/(\beta 2 t/\beta 2w)$ to be less than the lower limit, is not preferable since the variable magnification ratio of the entire system needs to be ensured by increasing the spacing between the first lens unit L1 and the second lens unit L2 at the telephoto end, leading to an increase in the overall length of the zoom lens.

The conditional expression (6) defines the Abbe number of the material of the positive lens of the second lens sub-unit L3b. If the Abbe number is so small as to be less than the lower limit, the secondary component of chromatic aberration of magnification on the wide-angle side is too large. This is not preferable since the secondary component needs to be corrected as much as possible to reduce color spreading in the peripheral portion of the image when the image of a high-contrast object is taken.

In Embodiment 1, it is more preferable to set the numerical values in the conditional expressions (1) to (6) as follows.

$(0.65 \times D3b) < d < 0.8 \times D3a$ (1a)

$0.8 < f3b/f3a < 1.2$ (2a)

$1.0 < f1/ft < 2.3$ (3a)

$0.02 < d23/ft < 0.15$ (4a)

$0.6 < (\beta 3t/\beta 3w)/(\beta 2t/\beta 2w) < 0.9$ (5a)

$75 < \nu 3b$ (6a)

Next, numerical value data of Numerical Examples 1 to 5 are shown. In each Numerical Example, i shows the order of an optical surface from the object side, Ri the radius of curvature of an ith optical surface (an ith surface), Di a spacing between the ith surface and the i+1 surface, Ni and $\nu$i the refractive index and the Abbe number of the material of the ith optical member for the d-line. An aspheric shape is represented by:

$$x = \frac{(1/R)h^2}{1 + \sqrt{\{1-(1+k)(h/R)^2\}}} + Bh^4 + Ch^6 + Dh^8 + Eh^{10}$$

where k represents the conic constant, B, C, D, E aspheric coefficients, x a displacement in the optical axis direction at a height h from the optical axis relative to the plane vertex, and R a radius of curvature. For example, "e-Z" means "$10^{-z}$." Table 1 shows values calculated with the aforementioned conditional expressions in the respective Numerical Examples. In addition, f represents a focal length, Fno an F number, and $\omega$ half of the field angle.

In Numerical Examples, R26 and R27 represent the optical block G.

Table 1 also shows values of the exit pupil distance at the wide-angle end and the telephoto end.

NUMERICAL EXAMPLE 1

| f = 1~6.81 Fno = 2.44~3.60 2$\omega$ = 74.2°~12.7° | | | |
|---|---|---|---|
| R1 = 9.527 | D1 = 0.24 | N1 = 1.846660 | $\nu$1 = 23.9 |
| R2 = 5.713 | D2 = 0.72 | N2 = 1.603112 | $\nu$2 = 60.6 |
| R3 = 76.147 | D3 = 0.03 | | |
| R4 = 5.157 | D4 = 0.47 | N3 = 1.603112 | $\nu$3 = 60.6 |
| R5 = 15.192 | D5 = Variable | | |
| R6 = 6.490 | D6 = 0.15 | N4 = 1.772499 | $\nu$4 = 49.6 |
| R7 = 1.281 | D7 = 0.72 | | |
| R8 = −5.831 | D8 = 0.12 | N5 = 1.719995 | $\nu$5 = 50.2 |
| R9 = 2.786 | D9 = 0.12 | | |
| R10 = 3.332 | D10 = 0.43 | N6 = 1.833100 | $\nu$6 = 23.9 |
| R11 = −4.317 | D11 = 0.09 | | |
| R12 = −2.477 | D12 = 0.11 | N7 = 1.772499 | $\nu$7 = 49.6 |
| R13 = −9.143 | D13 = Variable | | |
| R14 = Stop | D14 = 0.11 | | |
| R15 = 1.493 | D15 = 0.54 | N8 = 1.743300 | $\nu$8 = 49.3 |
| R16 = −13.935 | D16 = 0.58 | N9 = 1.647689 | $\nu$9 = 33.8 |
| R17 = 1.282 | D17 = 0.19 | | |
| R18 = 9.211 | D18 = 0.11 | N10 = 1.846660 | $\nu$10 = 23.9 |
| R19 = 1.768 | D19 = 0.49 | N11 = 1.701536 | $\nu$11 = 41.2 |
| R20 = −6.078 | D20 = 0.49 | | |
| R21 = 2.591 | D21 = 0.43 | N12 = 1.433870 | $\nu$12 = 95.1 |
| R22 = −7.077 | D22 = Variable | | |
| R23 = 3.491 | D23 = 0.35 | N13 = 1.804000 | $\nu$13 = 46.6 |
| R24 = −13.483 | D24 = 0.12 | N14 = 1.761821 | $\nu$14 = 26.5 |
| R25 = 14.406 | D25 = 0.27 | | |
| R26 = ∞ | D26 = 0.32 | N15 = 1.516800 | $\nu$15 = 64.2 |
| R27 = ∞ | | | |

| Variable | Focal length | | |
|---|---|---|---|
| spacing | 1.00 | 2.34 | 6.81 |
| D5 | 0.14 | 1.99 | 4.26 |
| D13 | 3.08 | 1.28 | 0.35 |
| D22 | 0.38 | 1.52 | 3.37 |

| Aspheric coefficient | | | | | |
|---|---|---|---|---|---|
| R10 | k = 6.34820e+00 | B = −3.81929e−04 | C = −1.75966e−02 | D = 1.32512e−02 | E = −1.59689e−02 |
| R11 | k = −6.36293e−01 | B = −7.10089e−04 | C = −2.66405e−03 | D = −1.75694e−03 | E = −1.86916e−03 |
| R15 | k = −4.21759e−01 | B = −8.89717e−03 | C = −2.34403e−03 | D = 1.33403e−02 | E = −1.47831e−02 |

NUMERICAL EXAMPLE 2

| f = 1~4.69 Fno = 2.47~3.22 2ω = 74.1°~18.3° | | | |
|---|---|---|---|
| R1 = 7.891 | D1 = 0.24 | N1 = 1.846660 | ν1 = 23.9 |
| R2 = 4.867 | D2 = 0.81 | N2 = 1.487490 | ν2 = 70.2 |
| R3 = 63.560 | D3 = 0.03 | | |
| R4 = 5.039 | D4 = 0.53 | N3 = 1.696797 | ν3 = 55.5 |
| R5 = 18.362 | D5 = Variable | | |
| R6 = 6.932 | D6 = 0.15 | N4 = 1.772499 | ν4 = 49.6 |
| R7 = 1.319 | D7 = 0.60 | | |
| R8 = −6.059 | D8 = 0.12 | N5 = 1.743997 | ν5 = 44.8 |
| R9 = 2.470 | D9 = 0.27 | | |
| R10 = 3.727 | D10 = 0.40 | N6 = 1.846660 | ν6 = 23.9 |
| R11 = −6.832 | D11 = 0.09 | | |
| R12 = −2.684 | D12 = 0.11 | N7 = 1.487490 | ν7 = 70.2 |
| R13 = −13.218 | D13 = Variable | | |
| R14 = Stop | D14 = 0.11 | | |
| R15 = 1.369 | D15 = 0.54 | N8 = 1.806100 | ν8 = 40.7 |
| R16 = −5.163 | D16 = 0.32 | N9 = 1.701536 | ν9 = 41.2 |
| R17 = 1.247 | D17 = 0.19 | | |
| R18 = 12.634 | D18 = 0.11 | N10 = 1.846660 | ν10 = 23.9 |
| R19 = 1.113 | D19 = 0.54 | N11 = 1.701536 | ν11 = 41.2 |
| R20 = −4.872 | D20 = 0.51 | | |
| R21 = 2.516 | D21 = 0.47 | N12 = 1.438750 | ν12 = 95.0 |
| R22 = −5.733 | D22 = Variable | | |
| R23 = 3.020 | D23 = 0.43 | N13 = 1.696797 | ν13 = 55.5 |
| R24 = −8.912 | D24 = 0.12 | N14 = 1.846660 | ν14 = 23.8 |
| R25 = 17.380 | D25 = 0.27 | | |
| R26 = ∞ | D26 = 0.40 | N15 = 1.516800 | ν15 = 64.2 |
| R27 = ∞ | | | |

| Variable | Focal length | | |
|---|---|---|---|
| spacing | 1.00 | 1.82 | 4.69 |
| D5 | 0.13 | 1.42 | 3.40 |
| D13 | 2.69 | 1.52 | 0.35 |
| D22 | 0.43 | 1.30 | 2.33 |

| Aspheric coefficient | | | | |
|---|---|---|---|---|
| R10 | k = 1.06605e+01 | B = −9.04390e−03 | C = −2.33522e−02 | D = 2.08204e−02 | E = −2.70310e−02 |
| R15 | k = −4.60017e−01 | B = −6.96826e−03 | C = 7.14048e−03 | D = −1.29140e−02 | E = 1.39686e−02 |

NUMERICAL EXAMPLE 3

| f = 1~7.80 Fno = 2.47~3.96 2ω = 74.1°~11.1° | | | |
|---|---|---|---|
| R1 = 8.961 | D1 = 0.24 | N1 = 1.846660 | ν1 = 23.9 |
| R2 = 5.891 | D2 = 0.69 | N2 = 1.603112 | ν2 = 60.6 |
| R3 = 92.370 | D3 = 0.03 | | |
| R4 = 5.125 | D4 = 0.49 | N3 = 1.496999 | ν3 = 81.5 |
| R5 = 16.053 | D5 = Variable | | |
| R6 = 7.039 | D6 = 0.15 | N4 = 1.772499 | ν4 = 49.6 |
| R7 = 1.272 | D7 = 0.62 | | |
| R8 = −30.079 | D8 = 0.12 | N5 = 1.719995 | ν5 = 50.2 |
| R9 = 2.303 | D9 = 0.13 | | |
| R10 = 4.119 | D10 = 0.43 | N6 = 1.833100 | ν6 = 23.9 |
| R11 = −3.544 | D11 = 0.08 | | |
| R12 = −1.879 | D12 = 0.11 | N7 = 1.804000 | ν7 = 46.6 |
| R13 = −4.765 | D13 = Variable | | |
| R14 = Stop | D14 = 0.11 | | |
| R15 = 1.436 | D15 = 0.54 | N8 = 1.743300 | ν8 = 49.3 |
| R16 = 7.412 | D16 = 0.39 | N9 = 1.603420 | ν9 = 38.0 |
| R17 = 1.298 | D17 = 0.19 | | |
| R18 = 8.642 | D18 = 0.11 | N10 = 1.761821 | ν10 = 26.5 |
| R19 = 1.722 | D19 = 0.49 | N11 = 1.603112 | ν11 = 60.6 |
| R20 = −5.108 | D20 = 0.40 | | |
| R21 = 3.197 | D21 = 0.47 | N12 = 1.433870 | ν12 = 95.1 |
| R22 = −5.439 | D22 = Variable | | |
| R23 = 3.081 | D23 = 0.40 | N13 = 1.804000 | ν13 = 46.6 |
| R24 = −11.224 | D24 = 0.13 | N14 = 1.761821 | ν14 = 26.5 |

-continued $f = 1\sim7.80$  Fno $= 2.47\sim3.96$  $2\omega = 74.1°\sim11.1°$

| | | | |
|---|---|---|---|
| R25 = 8.659 | D25 = 0.27 | | |
| R26 = ∞ | D26 = 0.32 | N15 = 1.516800 | ν15 = 64.2 |
| R27 = ∞ | | | |

| Variable | Focal length | | |
|---|---|---|---|
| spacing | 1.00 | 2.56 | 7.80 |
| D5 | 0.13 | 1.93 | 4.43 |
| D13 | 2.94 | 0.98 | 0.12 |
| D22 | 0.32 | 1.90 | 4.00 |

Aspheric coefficient

| | | | | | |
|---|---|---|---|---|---|
| R10 | k = 1.12024e+01 | B = −5.81964e−03 | C = −2.24651e−02 | D = 6.23755e−03 | E = −3.89114e−02 |
| R11 | k = 5.28620e+00 | B = −7.37130e−03 | C = 1.85877e−03 | D = −3.94514e−02 | E = 6.11034e−03 |
| R15 | k = −3.70683e−01 | B = −1.24747e−02 | C = 3.21885e−03 | D = −8.05549e−04 | E = −3.79733e−03 |

NUMERICAL EXAMPLE 4

$f = 1\sim4.71$  Fno $= 2.47\sim4.00$  $2\omega = 74.1°\sim18.2°$

| | | | |
|---|---|---|---|
| R1 = 7.966 | D1 = 0.24 | N1 = 1.846660 | ν1 = 23.9 |
| R2 = 5.275 | D2 = 0.76 | N2 = 1.487490 | ν2 = 70.2 |
| R3 = 49.266 | D3 = 0.03 | | |
| R4 = 6.732 | D4 = 0.47 | N3 = 1.696797 | ν3 = 55.5 |
| R5 = 23.986 | D5 = Variable | | |
| R6 = 4.391 | D6 = 0.15 | N4 = 1.772499 | ν4 = 49.6 |
| R7 = 1.320 | D7 = 0.59 | | |
| R8 = −4.289 | D8 = 0.12 | N5 = 1.743997 | ν5 = 44.8 |
| R9 = 2.223 | D9 = 0.24 | | |
| R10 = 3.619 | D10 = 0.40 | N6 = 1.846660 | ν6 = 23.9 |
| R11 = −7.062 | D11 = 0.11 | | |
| R12 = −2.602 | D12 = 0.11 | N7 = 1.487490 | ν7 = 70.2 |
| R13 = −6.600 | D13 = Variable | | |
| R14 = Stop | D14 = 0.11 | | |
| R15 = 1.388 | D15 = 0.54 | N8 = 1.806100 | ν8 = 40.7 |
| R16 = −8.832 | D16 = 0.36 | N9 = 1.701536 | ν9 = 41.2 |
| R17 = 1.287 | D17 = 0.19 | | |
| R18 = 28.474 | D18 = 0.11 | N10 = 1.846660 | ν10 = 23.9 |
| R19 = 1.109 | D19 = 0.54 | N11 = 1.701536 | ν11 = 41.2 |
| R20 = −4.886 | D20 = 0.51 | | |
| R21 = 2.849 | D21 = 0.47 | N12 = 1.516330 | ν12 = 64.1 |
| R22 = −5.357 | D22 = Variable | | |
| R23 = 2.474 | D23 = 0.47 | N13 = 1.696797 | ν13 = 55.5 |
| R24 = −8.219 | D24 = 0.12 | N14 = 1.846660 | ν14 = 23.8 |
| R25 = 10.966 | D25 = 0.27 | | |
| R26 = ∞ | D26 = 0.40 | N15 = 1.516800 | ν15 = 64.2 |
| R27 = ∞ | | | |

| Variable | Focal length | | |
|---|---|---|---|
| spacing | 1.00 | 1.88 | 4.71 |
| D5 | 0.13 | 1.71 | 4.24 |
| D13 | 2.55 | 1.32 | 0.30 |
| D22 | 0.82 | 1.89 | 3.08 |

Aspheric coefficient

| | | | | | |
|---|---|---|---|---|---|
| R10 | k = 1.01253e+01 | B = −7.06875e−03 | C = −2.52368e−02 | D = 2.56657e−03 | E = −3.27006e−02 |
| R15 | k = −4.81691e−01 | B = −5.92118e−03 | C = 5.95247e−03 | D = −1.24807e−02 | E = 2.03412e−02 |

NUMERICAL EXAMPLE 5 f = 1~6.72  Fno = 2.45~3.61  2ω = 74.2°~12.8°

| | | | |
|---|---|---|---|
| R1 = 8.366 | D1 = 0.24 | N1 = 1.846660 | ν1 = 23.9 |
| R2 = 5.350 | D2 = 0.72 | N2 = 1.603112 | ν2 = 60.6 |
| R3 = 51.245 | D3 = 0.03 | | |
| R4 = 6.215 | D4 = 0.43 | N3 = 1.603112 | ν3 = 60.6 |
| R5 = 19.963 | D5 = Variable | | |
| R6 = 8.195 | D6 = 0.15 | N4 = 1.772499 | ν4 = 49.6 |
| R7 = 1.304 | D7 = 0.62 | | |
| R8 = −8.120 | D8 = 0.12 | N5 = 1.712995 | ν5 = 53.9 |
| R9 = 2.792 | D9 = 0.18 | | |
| R10 = 4.160 | D10 = 0.43 | N6 = 1.846660 | ν6 = 23.9 |
| R11 = −3.386 | D11 = 0.06 | | |
| R12 = −2.239 | D12 = 0.12 | N7 = 1.882997 | ν7 = 40.8 |
| R13 = −6.742 | D13 = Variable | | |
| R14 = Stop | D14 = 0.11 | | |
| R15 = 1.445 | D15 = 0.54 | N8 = 1.743300 | ν8 = 49.3 |
| R16 = −17.513 | D16 = 0.54 | N9 = 1.647689 | ν9 = 33.8 |
| R17 = 1.293 | D17 = 0.19 | | |
| R18 = 10.929 | D18 = 0.11 | N10 = 1.603420 | ν10 = 38.0 |
| R19 = 1.366 | D19 = 0.62 | N11 = 1.496999 | ν11 = 81.5 |
| R20 = −3.616 | D20 = 0.27 | | |
| R21 = 2.461 | D21 = 0.41 | N12 = 1.433870 | ν12 = 95.1 |
| R22 = −19.494 | D22 = Variable | | |
| R23 = 3.253 | D23 = 0.38 | N13 = 1.772499 | ν13 = 49.6 |
| R24 = −12.739 | D24 = 0.12 | N14 = 1.846660 | ν14 = 23.9 |
| R25 = 28.016 | D25 = 0.27 | | |
| R26 = ∞ | D26 = 0.32 | N15 = 1.516330 | ν15 = 64.1 |
| R27 = ∞ | | | |

| Variable | Focal length | | |
|---|---|---|---|
| spacing | 1.00 | 2.29 | 6.72 |
| D5 | 0.20 | 2.10 | 4.48 |
| D13 | 2.98 | 1.35 | 0.35 |
| D22 | 0.40 | 1.76 | 3.63 |

Aspheric coefficient

| | | | | | |
|---|---|---|---|---|---|
| R10 | k = −2.51350e+00 | B = 2.56313e−02 | C = −8.97160e−03 | D = 3.53085e−03 | E = −1.09185e−02 |
| R11 | k = 1.34390e+00 | B = 8.55219e−04 | C = −8.88809e−03 | D = −2.99691e−03 | E = −5.04686e−03 |
| R15 | k = −4.68634e−01 | B = −7.76638e−03 | C = 7.44966e−04 | D = 0.00000e+00 | E = 0.00000e+00 |

TABLE 1

| Conditional Expression | Numerical example | | | | |
|---|---|---|---|---|---|
| | 1 | 2 | 3 | 4 | 5 |
| (1) 0.6 × D3b | 0.26 | 0.28 | 0.28 | 0.28 | 0.25 |
| d | 0.49 | 0.51 | 0.40 | 0.51 | 0.27 |
| D3a | 1.91 | 1.70 | 1.72 | 1.74 | 2.00 |
| (2) t3b/f3a | 1.06 | 1.02 | 1.13 | 0.85 | 1.23 |
| (3) f1/ft | 1.27 | 1.69 | 1.14 | 2.07 | 1.35 |
| (4) d23/ft | 0.067 | 0.098 | 0.029 | 0.087 | 0.068 |
| (5) (β3t/β3w)/(β2t/β2w) | 0.66 | 0.75 | 0.74 | 0.83 | 0.71 |
| (6) ν3b | 95.1 | 95.0 | 95.1 | 64.1 | 95.1 |
| Distance to exit pupil at wide-angle end | −12.6 | −11.3 | −9.3 | −26.9 | −11.7 |
| Distance to exit pupil at telephoto end | 29.8 | −92.0 | 25.9 | 22.4 | 18.5 |

According to the zoom lens of Embodiment 1 described above, the third lens unit consists of the front lens unit and the rear lens unit disposed with a certain air spacing between them. The rear lens unit of the third lens unit serves to a field lens particularly on the wide-angle side to locate the exit pupil on the wide-angle side away from the image plane and reduce variations in the exit pupil in zooming, thereby realizing the zoom lens which is compatible with a solid-state image-pickup device over the entire zoom range.

(Embodiment 2)

Figure 22:
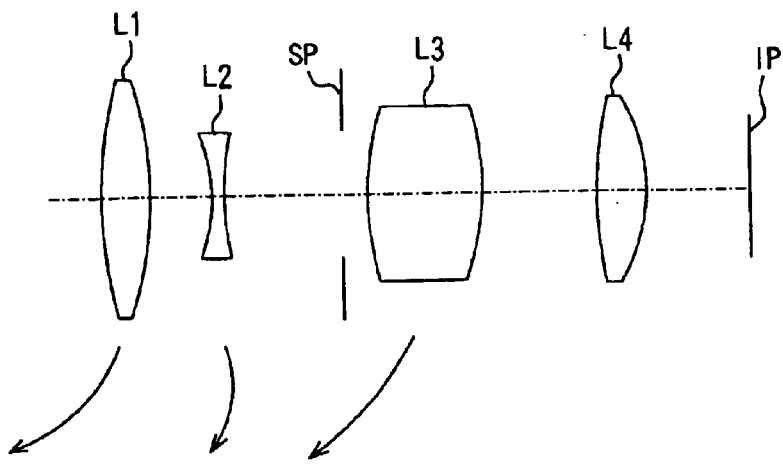
FIG. 22 is an explanatory view of a paraxial refractive power arrangement in a zoom lens of Embodiment 2 according to the present invention.

Next, description is made for a zoom lens of Embodiment 2 corresponding to Numerical Examples 6 to 10, later described. FIG. 22 is an explanatory view of a paraxial refractive power arrangement in the zoom lens of Embodiment 2.

Figure 23:
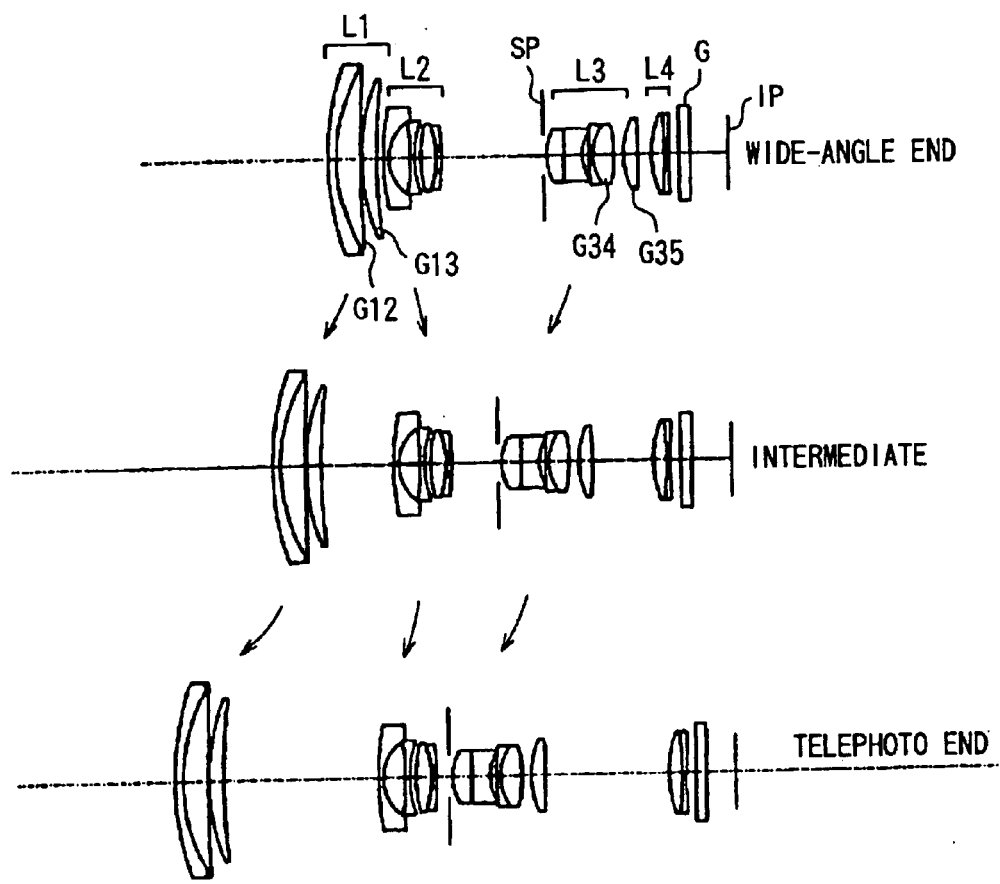
FIG. 23 is a section view of a zoom lens of Numerical Example 6 at the wide-angle end.
Figure 24:
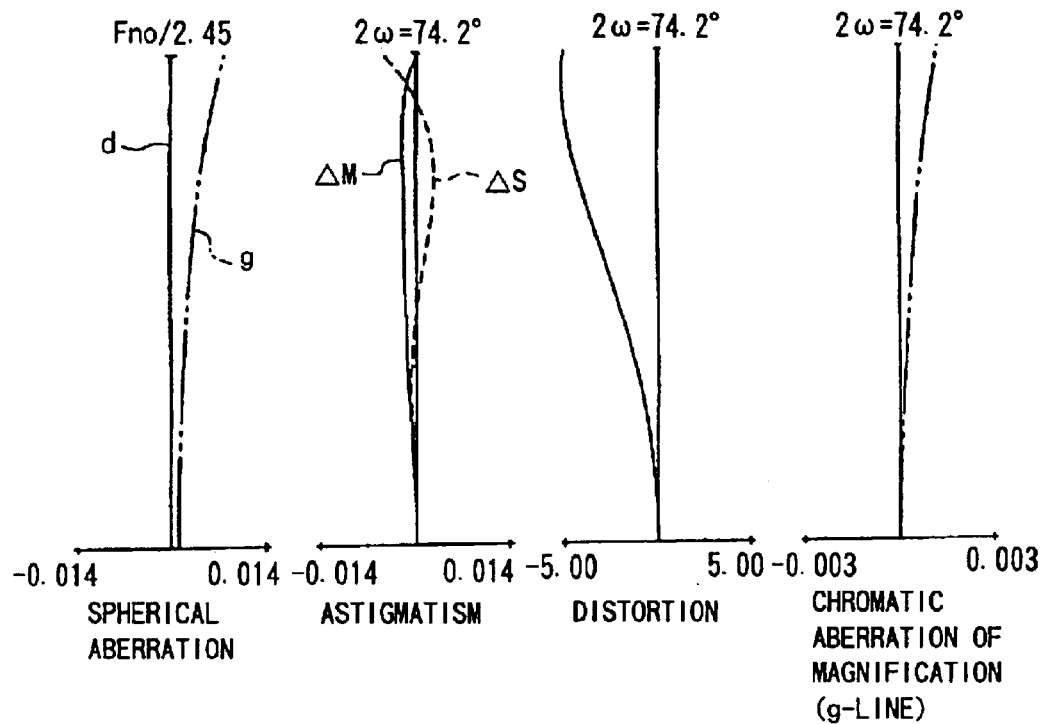
FIG. 24 shows various types of aberration in the zoom lens of Numerical Example 6 at the wide-angle end.
Figure 25:
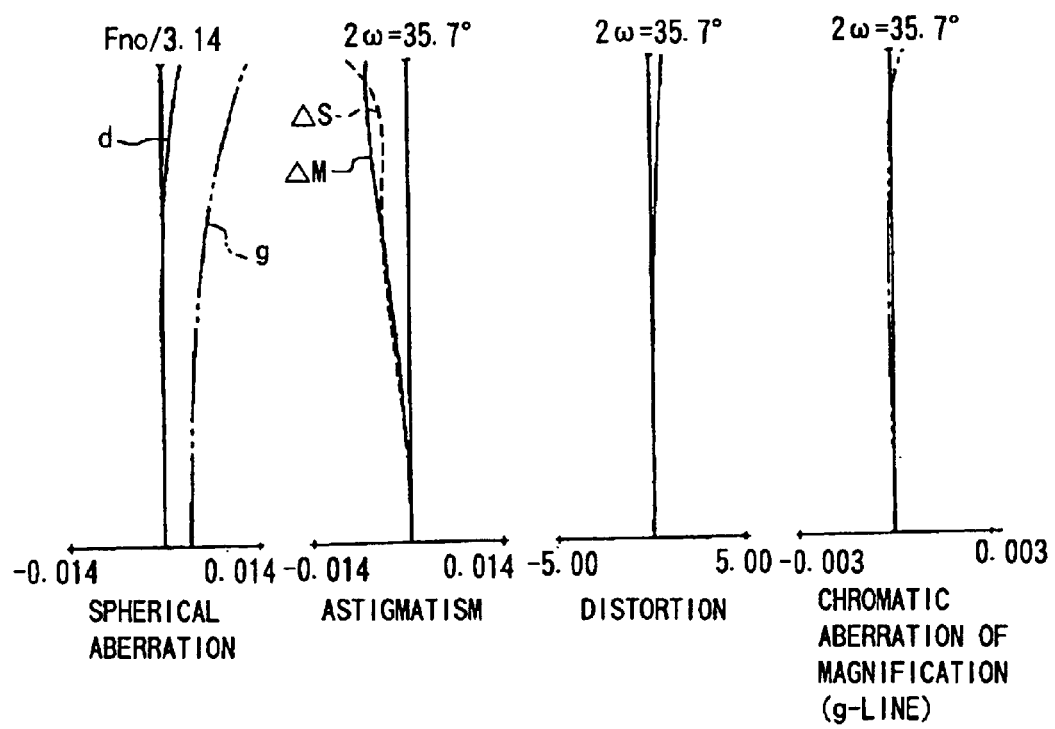
FIG. 25 shows various types of aberration in the zoom lens of Numerical Example 6 at the intermediate zoom position.
Figure 26:
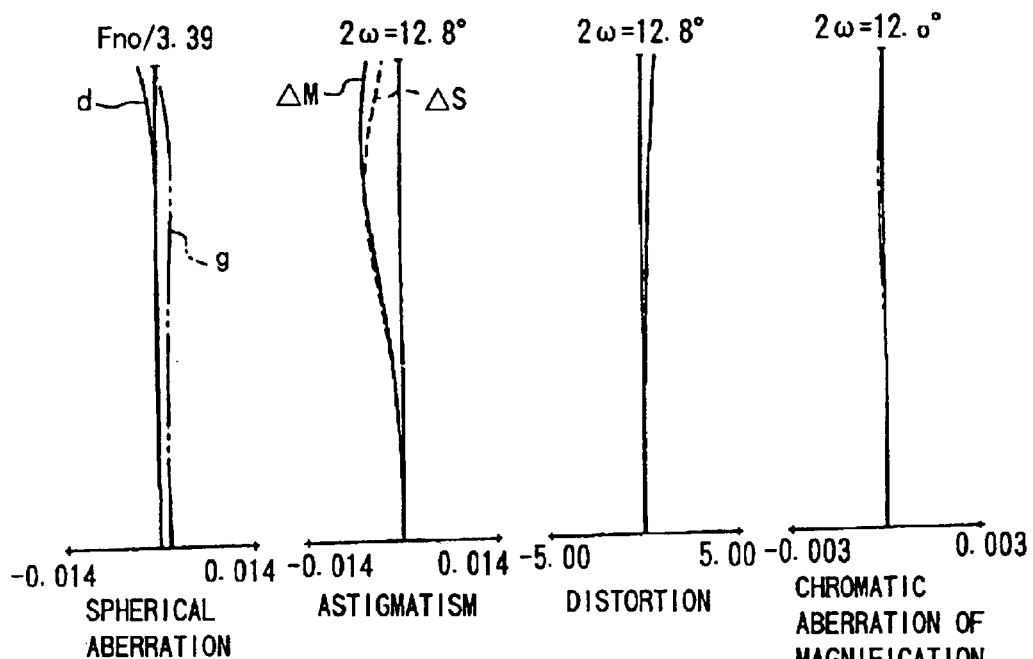
FIG. 26 shows various types of aberration in the zoom lens of Numerical Example 6 at the telephoto end.

FIG. 23 is a section view of main portions of a zoom lens of Numerical Example 6. FIGS. 24 to 26 show various types of aberration at the wide-angle end, intermediate focal length, and telephoto end of the zoom lens of Numerical Example 6.

Figure 27:
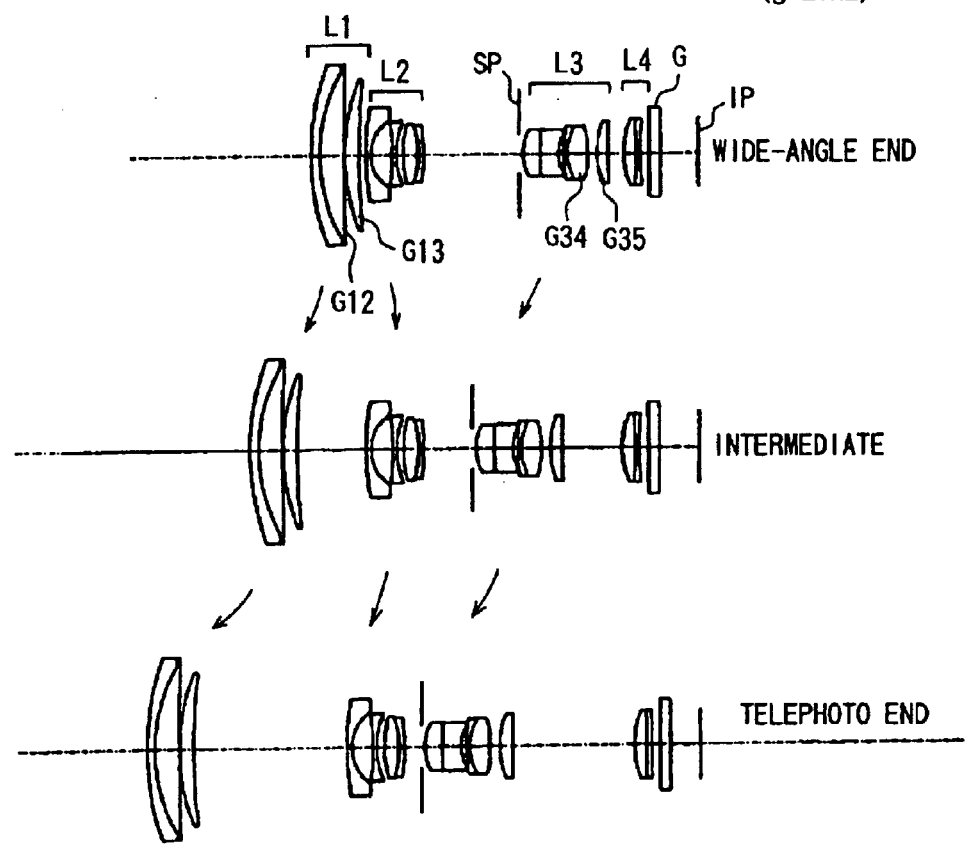
FIG. 27 is a section view of a zoom lens of Numerical Example 7 at the wide-angle end.
Figure 28:
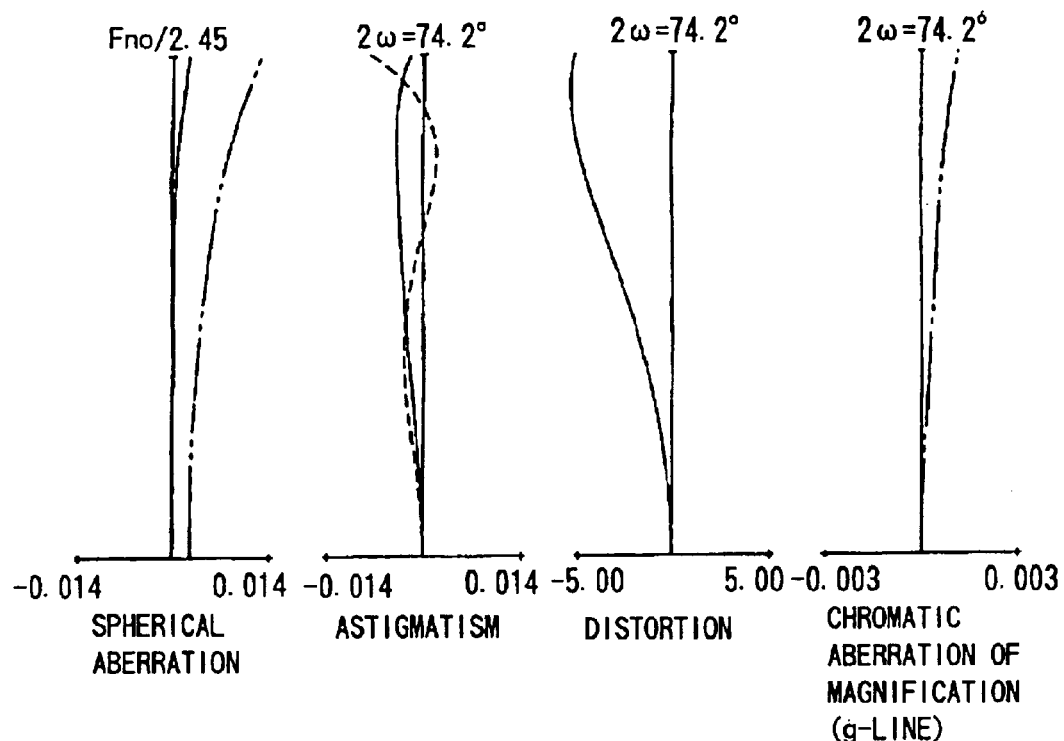
FIG. 28 shows various types of aberration in the zoom lens of Numerical Example 7 at the wide-angle end.
Figure 29:
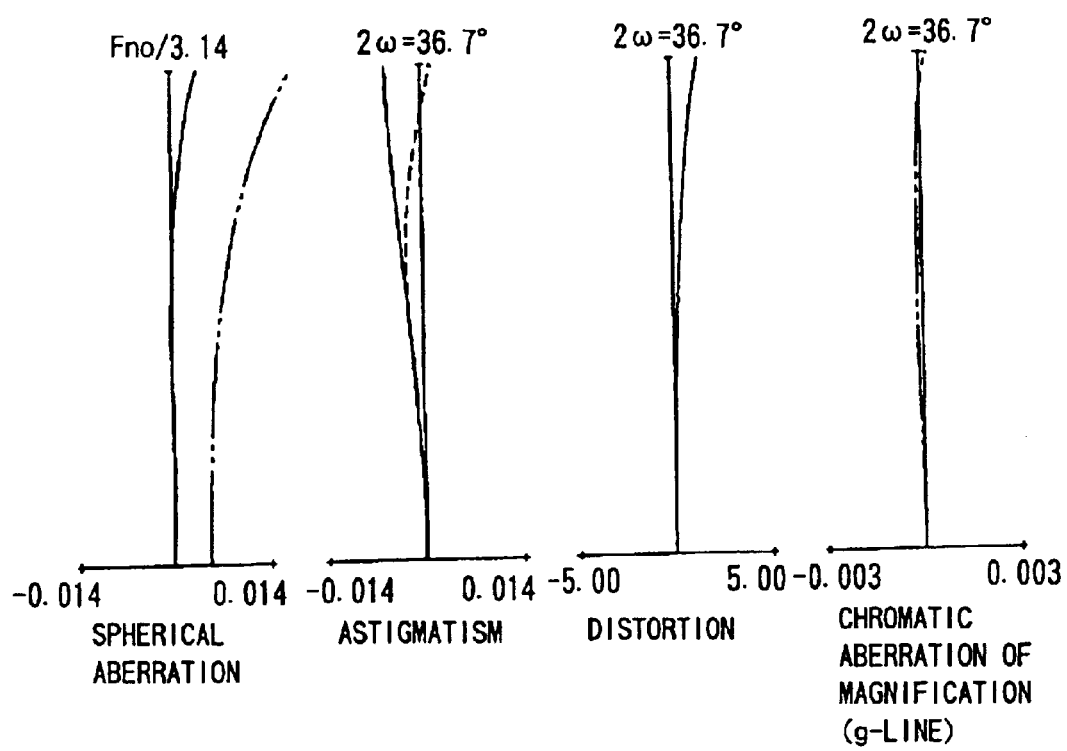
FIG. 29 shows various types of aberration in the zoom lens of Numerical Example 7 at the intermediate zoom position.
Figure 30:
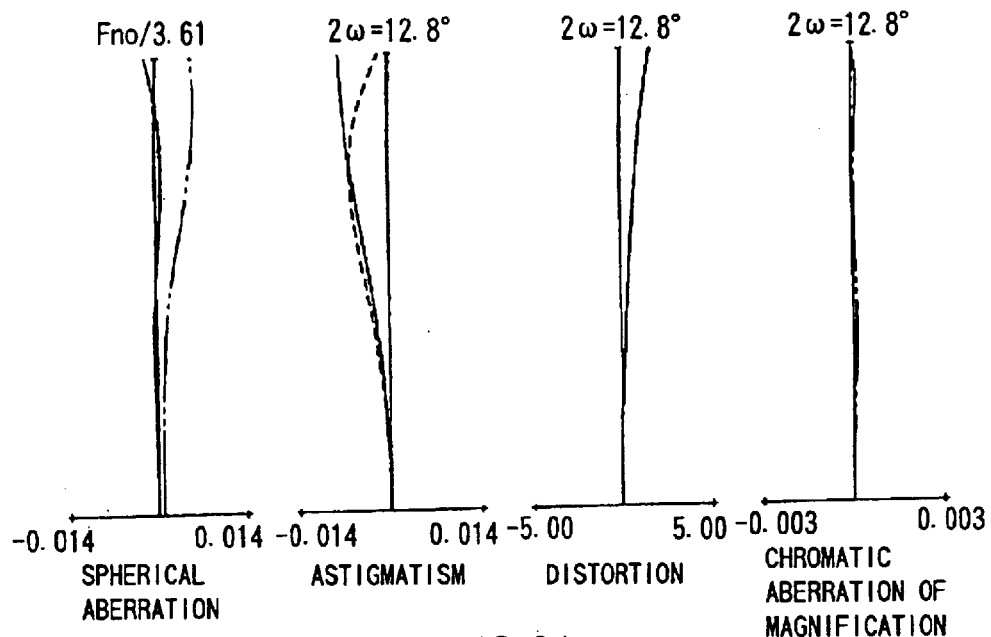
FIG. 30 shows various types of aberration in the zoom lens of Numerical Example 7 at the telephoto end.

FIG. 27 is a section view of main portions of a zoom lens of Numerical Example 7. FIGS. 28 to 30 show various types of aberration at the wide-angle end, intermediate focal length, and telephoto end of the zoom lens of Numerical Example 7.

Figure 31:
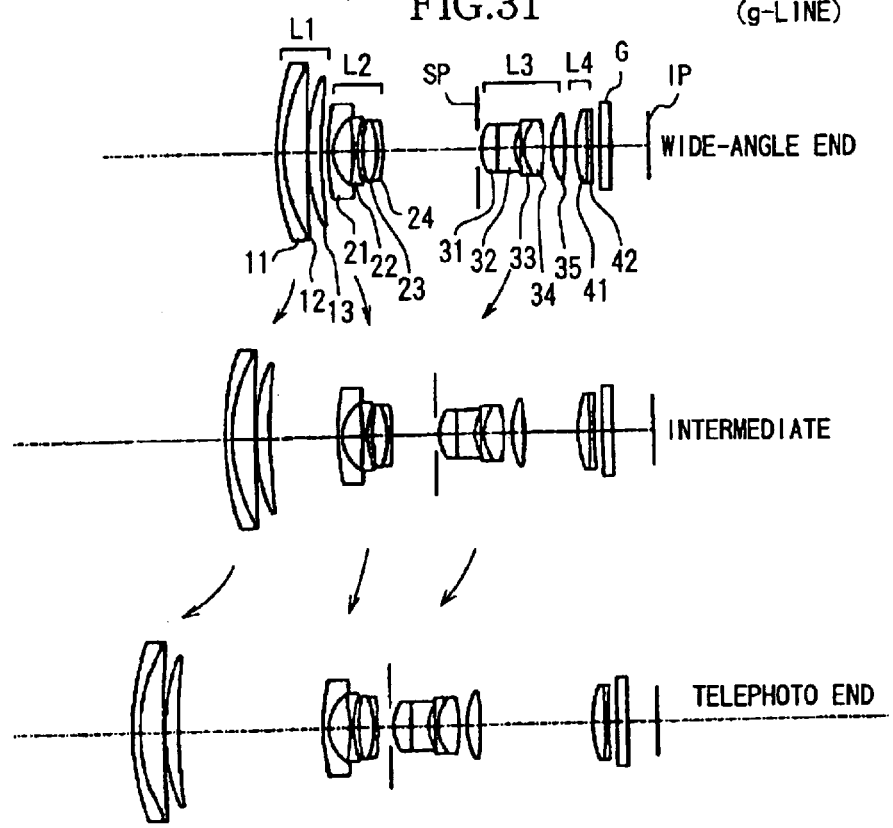
FIG. 31 is a section view of a zoom lens of Numerical Example 8 at the wide-angle end.
Figure 34:
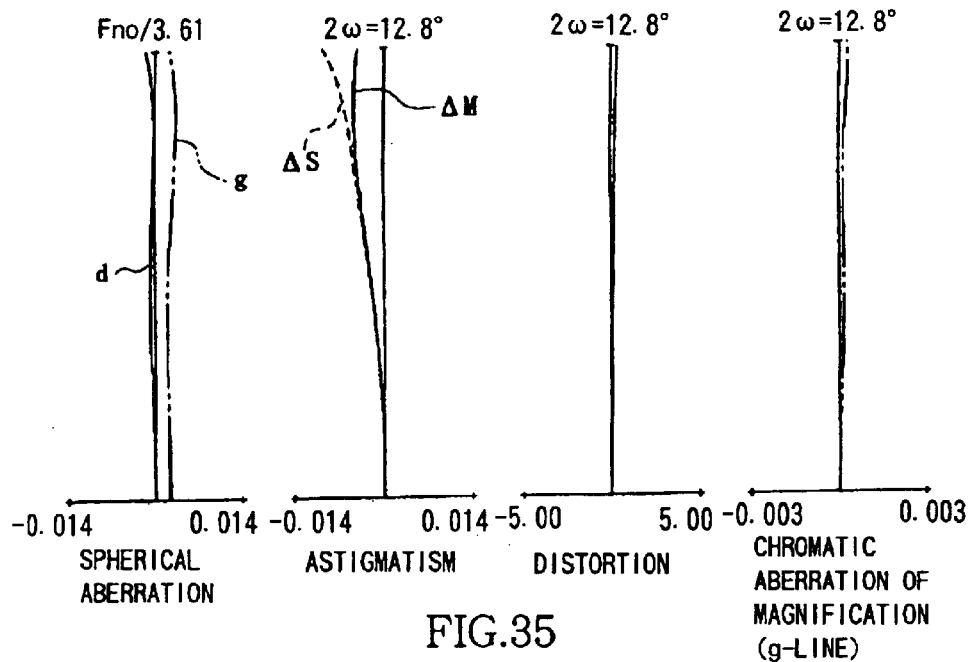
FIG. 34 shows various types of aberration in the zoom lens of Numerical Example 8 at the telephoto end.

FIG. 31 is a section view of main portions of a zoom lens of Numerical Example 8. FIGS. 32 to 34 show various types of aberration at the wide-angle end, intermediate focal length, and telephoto end of the zoom lens of Numerical Example 8.

Figure 35:
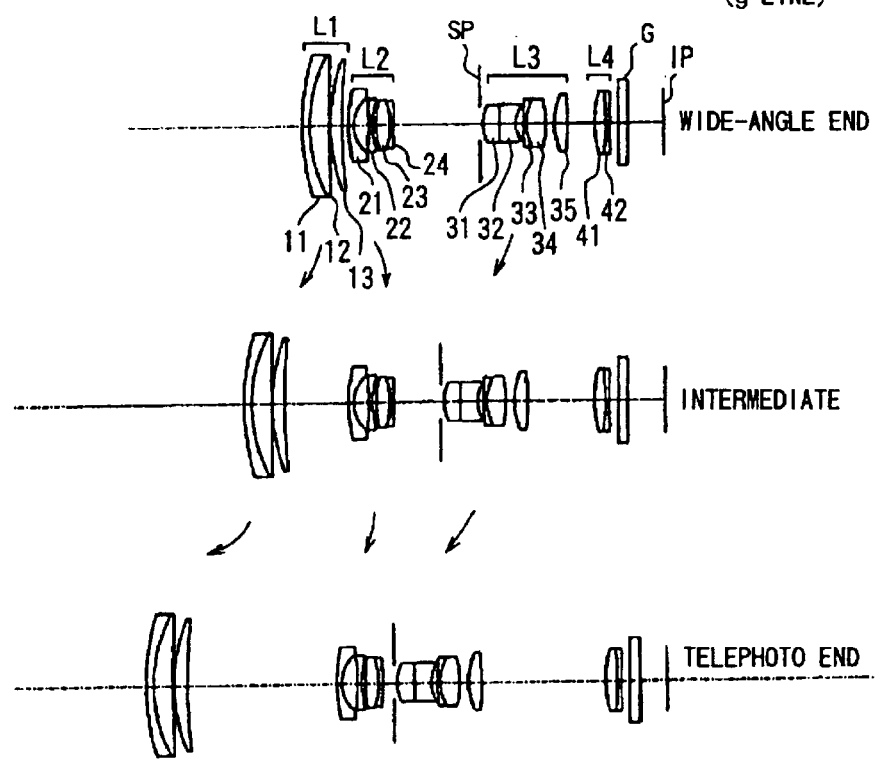
FIG. 35 is a section view of a zoom lens of Numerical Example 9 at the wide-angle end.
Figure 36:
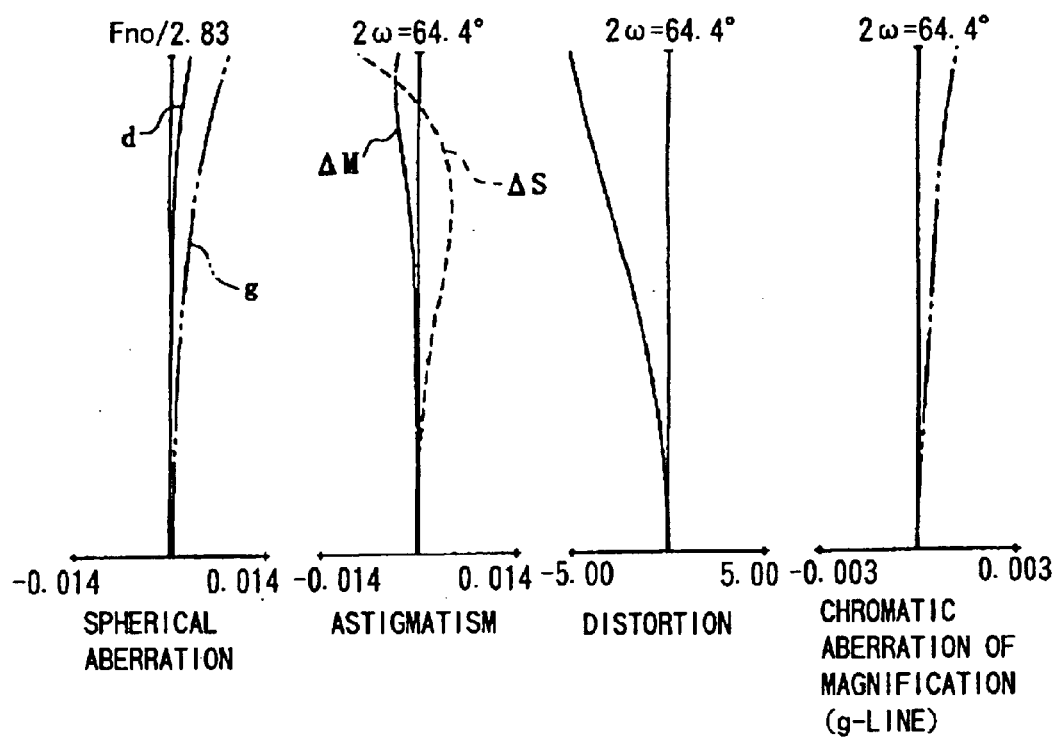
FIG. 36 shows various types of aberration in the zoom lens of Numerical Example 9 at the wide-angle end.
Figure 37:
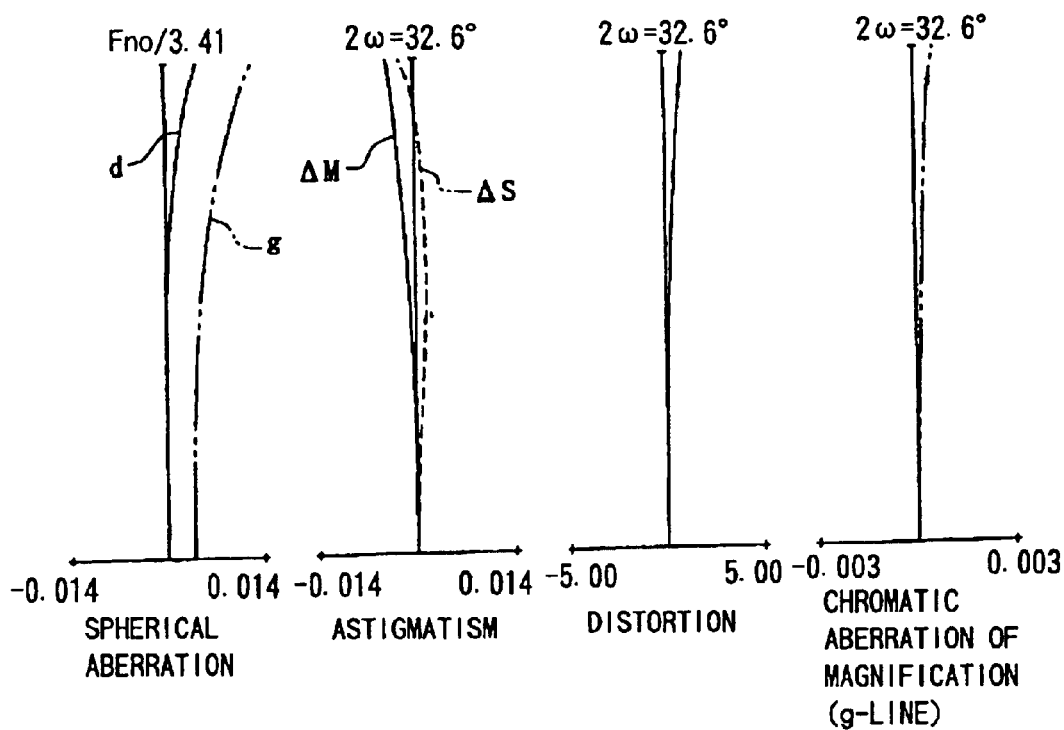
FIG. 37 shows various types of aberration in the zoom lens of Numerical Example 9 at the intermediate zoom position.
Figure 38:
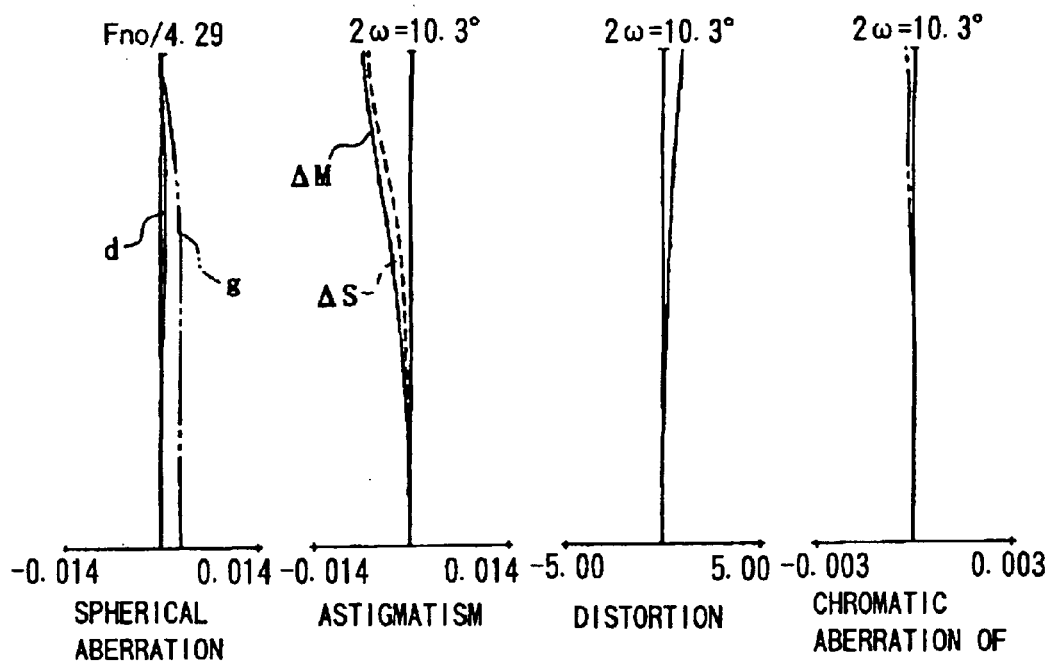
FIG. 38 shows various types of aberration in the zoom lens of Numerical Example 9 at the telephoto end.

FIG. 35 is a section view of main portions of a zoom lens of Numerical Example 9. FIGS. 36 to 38 show various types of aberration at the wide-angle end, intermediate focal length, and telephoto end of the zoom lens of Numerical Example 9.

Figure 39:
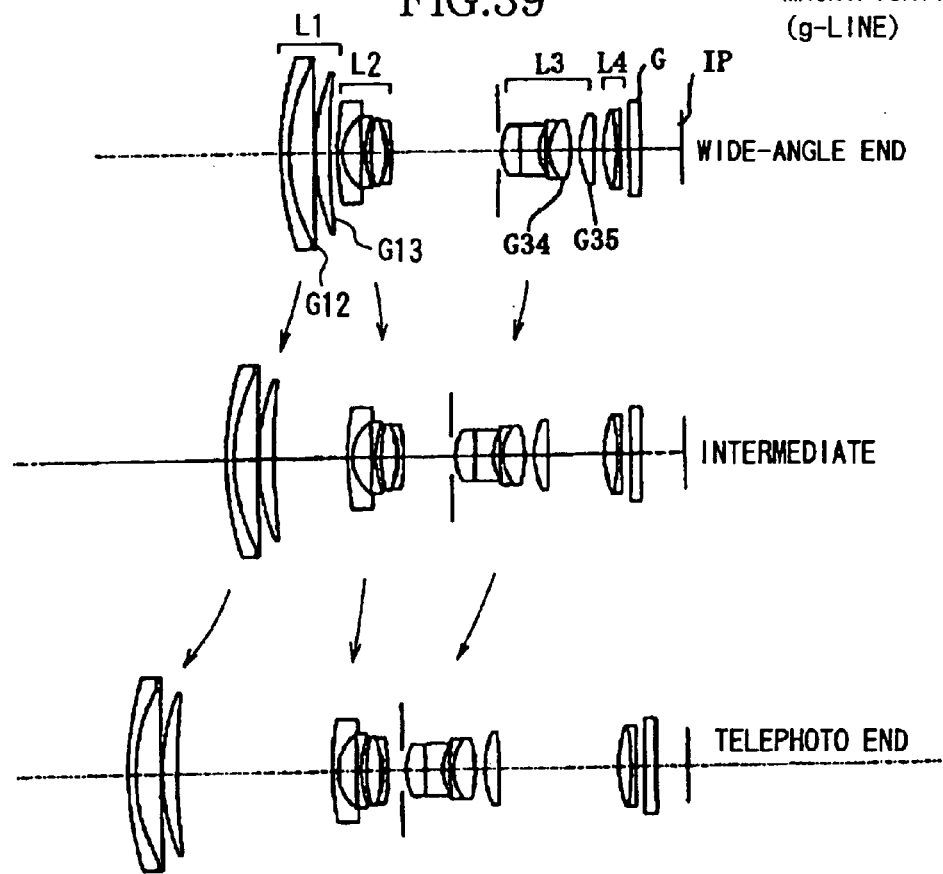
FIG. 39 is a section view of a zoom lens of Numerical Example 10 at the wide-angle end.
Figure 40:
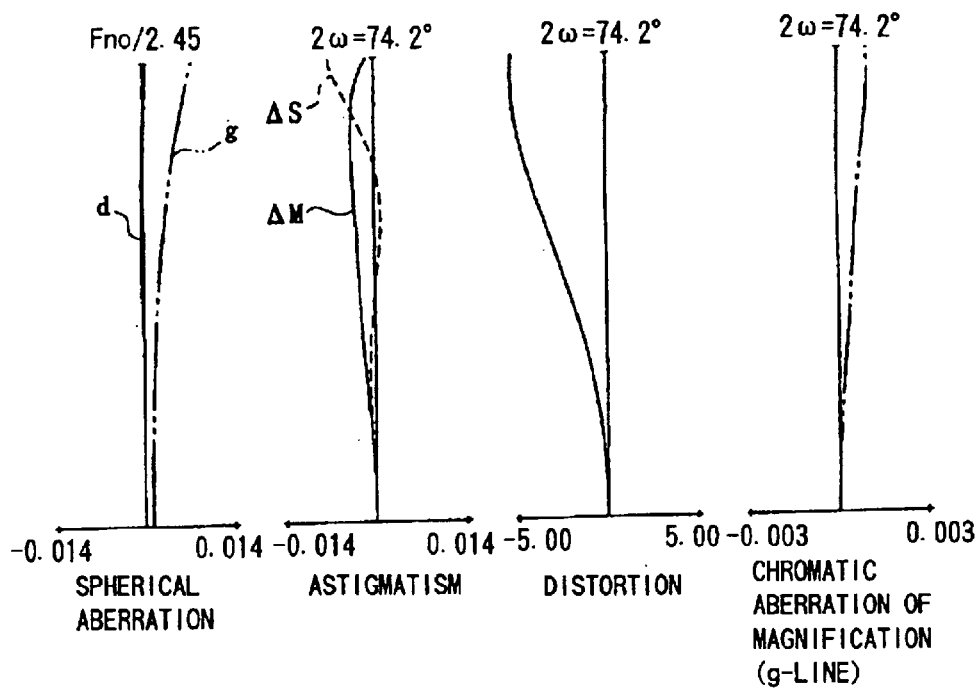
FIG. 40 shows various types of aberration in the zoom lens of Numerical Example 10 at the wide-angle end.
Figure 41:
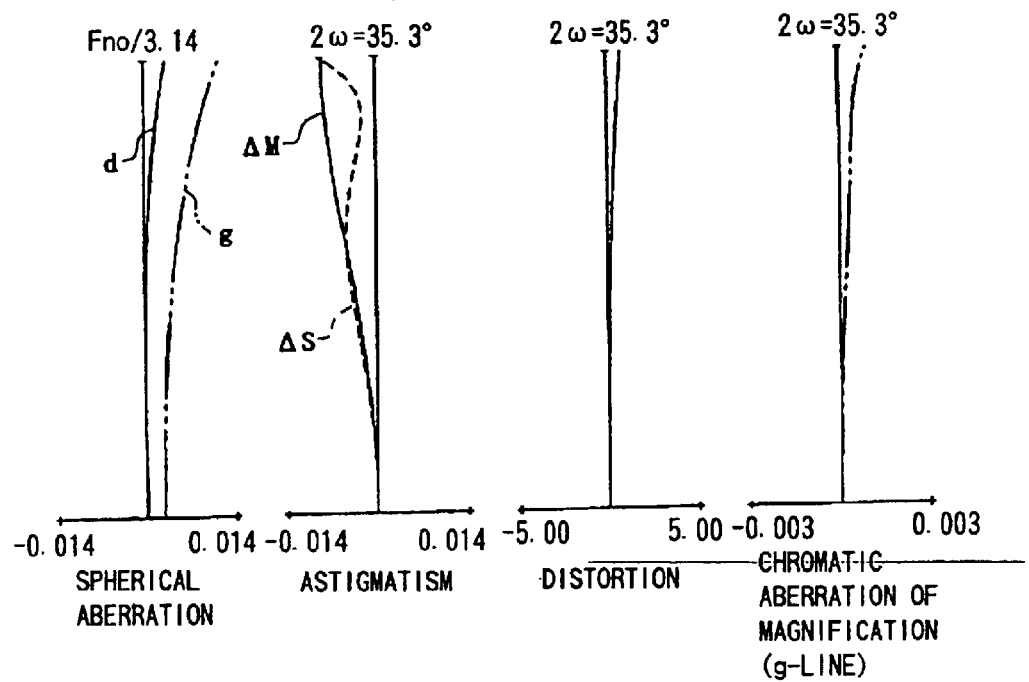
FIG. 41 shows various types of aberration in the zoom lens of Numerical Example 10 at the intermediate zoom position.
Figure 42:
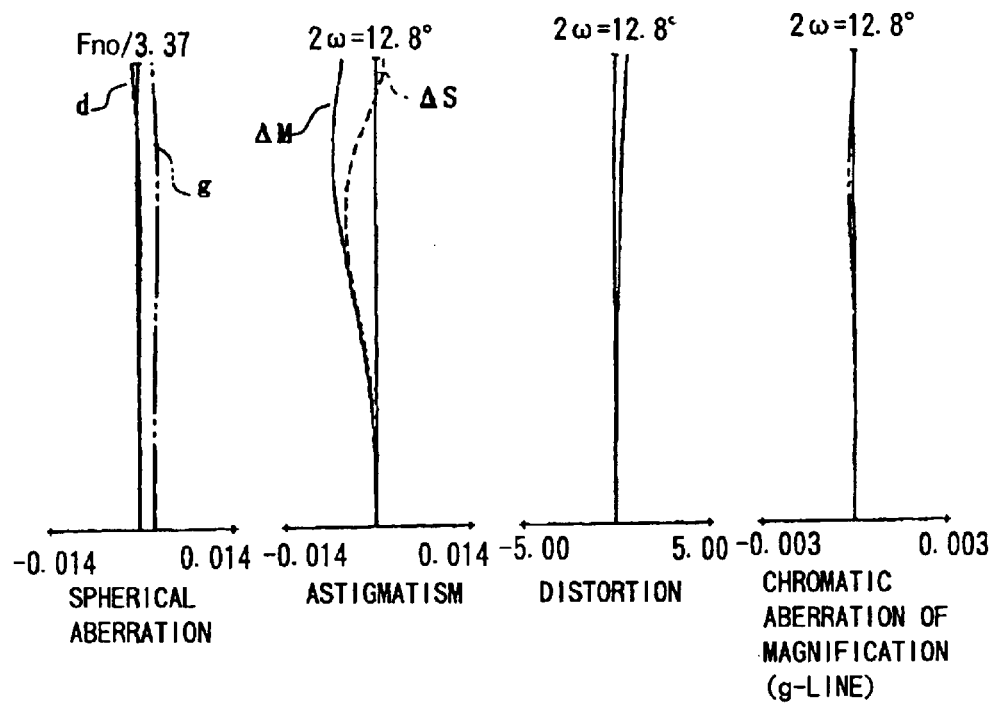
FIG. 42 shows various types of aberration in the zoom lens of Numerical Example 10 at the telephoto end.

FIG. 39 is a section view of main portions of a zoom lens of Numerical Example 10. FIGS. 40 to 42 show various types of aberration at the wide-angle end, intermediate focal length, and telephoto end of the zoom lens of Numerical Example 10.

Figure 43:
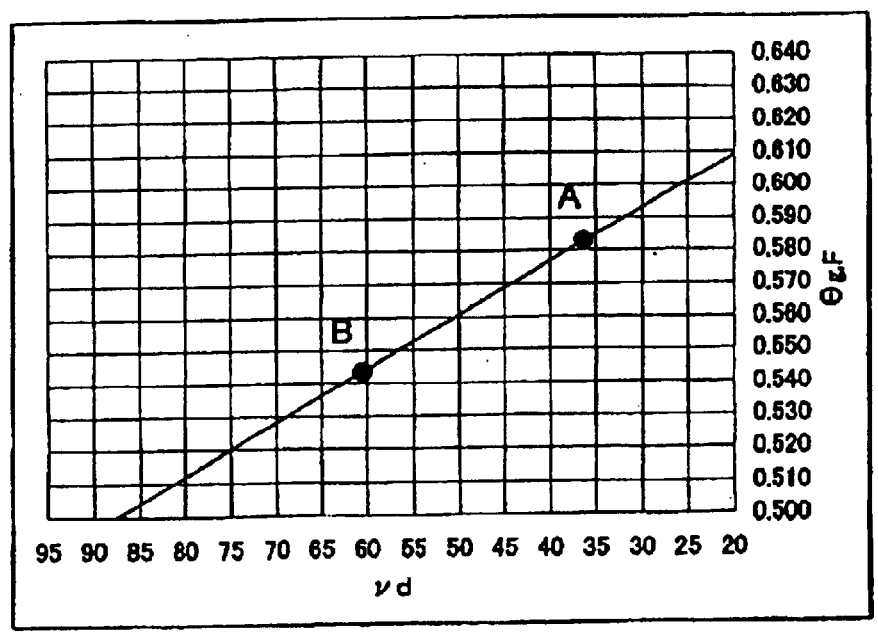
FIG. 43 is a graph showing the relationship between the Abbe number vd and the partial dispersion ratio Θg, F.

FIG. 43 is a graph for explaining the relationship between the Abbe number vd and the partial dispersion ratio Θg, F.

In the explanatory view of the paraxial refractive power arrangement of FIG. 22 and the section view of the zoom lens in each of Numerical Examples, L1 shows a first lens unit having a positive refractive power, L2 shows a second lens unit having a negative refractive power, L3 shows a third lens unit having a positive refractive power, and L4 shows a fourth lens unit having a positive refractive power. SP shows an aperture stop located in front of the third lens unit L3.

G shows an optical block which corresponds to an optical filter, a faceplate or the like and is provided in design. IP shows an image plane at which an image-pickup surface of a solid-state image-pickup device such as a CCD sensor and a CMOS sensor is located.

In each aberration diagram, d and g show a d-line and a g-line, respectively. AM and AS show a meridional image plane and a sagittal image plane, respectively. The chromatic aberration of magnification is represented by the g-line.

In Embodiment 2, the first, second, third lens units L1, L2, L3 are moved as shown by arrows in zooming from the wide-angle end to the telephoto end.

The first, second, third lens units L1, L2, L3 are moved for zooming such that the spacing between the first lens unit L1 and the second lens unit L2 is larger, the spacing between the second lens unit L2 and the third lens unit L3 is smaller, and the spacing between the third lens unit L3 and the fourth lens unit L4 is larger at the telephoto end than at the wide-angle end.

Specifically, in zooming from the wide-angle end to the telephoto end, the first lens unit L1 and the second lens unit L2 are moved towards an object along part of a convex track towards an image. The third lens unit L3 is moved towards the object. The fourth lens unit L4 is not moved for zooming. Focusing is achieved by the second lens unit L2 or the fourth lens unit L4.

The first lens unit L1 is moved in zooming to reduce the overall length of the zoom lens at the wide-angle end zoom position to achieve a reduction in size in the optical axis direction. In addition, the spacing between the first lens unit L1 and the aperture stop SP is reduced at a zoom position on the wide-angle side to reduce the effective diameter of the first lens unit L1, leading to a reduced diameter of the front element.

The third lens unit L3 is moved towards the object in zooming from the wide-angle end to the telephoto end, and the moving track is set such that the spacing between the third lens unit L3 and the fourth lens unit L4 is increased in zooming from the wide-angle end to the telephoto end to cause the third lens unit L3 to make a contribution to the variable magnification action. This can diminish the variable magnification action provided by changing the spacing between the first lens unit L1 and the second lens unit L2, so that it is possible to set a smaller spacing between the first lens unit L1 and the second lens unit L2 at the telephoto end zoom position. Consequently, the overall length of the zoom lens at the telephoto end and the diameter of the front element are reduced.

The aperture stop SP may be moved together with the third lens unit L3 or may be moved separately from the third lens unit L3 in zooming. If the aperture stop SP is moved together with the third lens unit L3, the number of movable lens units can be reduced to facilitate simplification of the mechanical structure. If the aperture stop SP is moved separately from the third lens unit L3, the diameter of the front element is advantageously reduced especially when the aperture stop SP is moved along a convex track towards the object.

The second lens unit L2 is moved along the convex track towards the image during zooming from the wide-angle end to the telephoto end. This favorably achieves primary achromatism at an intermediate zoom position to satisfactorily correct chromatic aberration over the entire zoom range.

In the zoom lens of Embodiment 2, the first lens unit L1 consists of, in order from the object side, a cemented lens formed of a negative lens and a positive lens (or a cemented lens formed of a positive lens and a negative lens may be used) and a positive lens. The minimum number of constituent lenses are used to provide a high zoom ratio and correct chromatic aberration such as axial chromatic aberration and chromatic aberration of magnification as well as spherical aberration. The use of glass with low dispersion and anomalous dispersion for a positive lens is effective in correcting a secondary spectrum at a zoom position on the telephoto side in the lens structure described above. However, a glass material with anomalous dispersion is difficult to process, and if it is used in the first lens unit L1 with a large effective diameter, manufacturing thereof is difficult. In addition, anomalous dispersion glass with low dispersion typically has a low refractive index, so that the glass has a larger curvature (a smaller radius of curvature) to provide a desired refractive power, thereby making it difficult to correct spherical aberration at a zoom position on the telephoto-side. Especially, if the first lens unit L1 has a higher refractive power, correction of spherical aberration is more difficult.

In view of the foregoing, the zoom lens in Embodiment 2 employs a lens made of anomalous dispersion glass in the third lens unit L3, not in the first lens unit L1, to correct the secondary spectrum of axial chromatic aberration at a zoom position on the telephoto side. The use of the anomalous dispersion glass in the lens unit in which the height of axial rays is high is effective in correcting the secondary spectrum of the axial chromatic aberration. In Embodiment 2, the glass is used for positive lenses of the third lens unit L3 through which axial rays pass at the second highest levels next to the first lens unit L1 to make the correction. This can reduce the outside diameter of the lens to the half or less as compared with the case where the glass is used in the first lens unit L1 to solve the processing problem.

For example, in Numerical Example 6 shown in FIG. 23, a fourth lens G34 and a fifth lens G35 of the third lens unit L3 in order from the object side are positive lenses with anomalous dispersion. The positive lens G34 on the object side is a lens with the trade name of S-FPL51 manufactured by Ohara Inc. (with a refractive index of 1.49700 and an Abbe number of 81.5). The positive lens G35 on the image side is a lens with the trade name of CAF2 manufactured by Optron Inc. (with a refractive index of 1.43387 and an Abbe number of 95.1).

It should be noted that, in each of Numerical Examples 7 to 10, anomalous dispersion glass is used for a positive lens G34 and a positive lens G35 in a third lens unit L3, although the values of the Abbe number are somewhat different.

In Embodiment 2, two positive lenses G12 and G13 of the first lens unit L1 are lenses with the trade name of S-BSM14 manufactured by Ohara Inc. (with a refractive index of 1.60311 and an Abbe number of 60.6) with no anomalous dispersion. Since each of them has a higher refractive index than anomalous dispersion glass, the curvature of each lens surface is reduced (the radius of curvature is increased) to suppress occurrence of spherical aberration in the first lens unit L1 on the telephoto side.

In Embodiment 2, the first lens unit L1 and the third lens unit L3 are formed in this manner to favorably correct the secondary spectrum of the axial chromatic aberration and spherical aberration at a zoom position on the telephoto side.

To enhance the effect of correcting the secondary spectrum by the lenses made of anomalous dispersion glass of the third lens unit L3, the refractive powers of the lens surfaces need to be increased to some extent. When a cemented lens is not used but a single lens is used, the refractive index of the lens itself may be increased. When anomalous dispersion glass is used for a cemented lens, the correction effect is enhanced by increasing the curvature of the cemented lens surface (reducing the radius of curvature). Especially for the cemented lens surface, the secondary spectrum can be corrected without significantly causing higher order components of spherical aberration and comatic aberration. In addition, the curvature of the cemented lens surface can be increased to make the correction without considerably increasing the refractive power of the whole cemented lens. Thus, the refractive power of the lens made of anomalous dispersion glass can be increased without increasing the refractive power of the whole third lens unit L3 more than necessary. For example, when the correction effect is enhanced by increasing the refractive power of any of a plurality of lenses made of anomalous dispersion glass in Embodiment 2, the use of such a cemented lens is effective.

The positive lenses made of anomalous dispersion glass of the third lens unit L3 disposed at positions somewhat away from the aperture stop SP in the optical axis direction are effective in correcting the secondary spectrum of chromatic aberration of magnification since off-axis principal rays are bent at positions away from the optical axis. For example, in Embodiment 2, both of the positive lenses G34 and G35 are disposed on the image side in the third lens unit L3. Especially the positive lens G35 serves as a field lens together with the fourth lens unit L4 at a zoom position on the wide-angle side to lead off-axis rays telecentrically. When off-axis rays are bent, primary achromatism in chromatic aberration of magnification can be achieved by using a negative lens made of a high dispersion glass material, but correction of a secondary spectrum is effectively realized by using anomalous dispersion glass for a positive lens. The positive lens G35 has such an effect and particularly contributes to correction of the secondary spectrum of chromatic aberration of magnification at a zoom position on the wide-angle side.

In Embodiment 2, the third lens unit L3 includes two cemented lenses. When the third lens unit L3 is moved to make a contribution to variable magnification, it is necessary to satisfactorily correct various types of aberration occurring in the third lens unit L3 including variation components due to variations of magnification. When the third lens unit L3 has a lateral magnification close to one, well-balanced correction can be made to various types of aberration by forming the third lens unit L3 in a symmetric form. A triplet is a representative example as a symmetric lens arrangement. In Embodiment 2, the negative and positive lens components of the triplet are divided into two components to increase flexibility in correction of aberration, thereby more favorably correcting various types of aberration such as spherical aberration, comatic aberration and curvature of field.

The zoom lens of Embodiment 2 achieves focusing by the fourth lens unit L4 or the second lens unit L2. When the fourth lens unit L4 is used for focusing, rear focusing is performed in which the relatively small and lightweight lens unit is moved as compared with focusing achieved by the front element. Thus, the rear focusing advantageously requires only a small driving force. Also, it is compatible with an autofocus system due to fast focusing. When the second lens unit L2 is used for focusing, focus sensitivity is high at a zoom position on the telephoto side, so that the extending amount of the lens can be advantageously reduced to cause smaller variations in aberration for an object at a short distance.

Next, description is made for characteristics other than the foregoing in each Embodiment.

The third lens unit L3 includes one or more positive lenses, and at least one positive lens satisfies the following conditions:

$$vd > 80 \quad (7)$$

$$\Theta g, F > 0.530 \quad (8)$$

where vd is defined as:

$$vd = \frac{Nd - 1}{NF - NC}$$

and $\Theta g, F$ is defined as:

$$\Theta g, F = \frac{Ng - NF}{NF - NC}$$

where Nd, NF, NC, and Ng represent refractive indexes of the material for a d-line, an F-line, a C-line, and a g-line of Fraunhofer lines, vd the Abbe number of the material, and $\Theta g, F$ the partial dispersion ratio.

The conditional expressions (7) and (8) are provided for favorably correcting the secondary spectrum of axial chromatic aberration at a zoom position on the telephoto side. When primary achromatism has been performed on axial chromatic aberration at a zoom position on the telephoto side, overcorrection typically occurs on the short wavelength side such as the g-line to cause the focusing position for short wavelengths to be located beyond the focusing position for the reference wavelength. Generally, a glass medium tends to have a higher refractive index for a shorter wavelength. Thus, the displacement of the focusing position for the short wavelengths located beyond the focusing position for the reference wavelength is reduced by using a material with a much higher refractive index on the shorter wavelength side for a positive lens. A large partial dispersion ratio $\Theta g, F$, that is, a larger value of (Ng-NF) than the value of primary dispersion of (NF-NC) means that the difference in the refractive index between the F-line and the g-line is larger relative to the difference in the refractive index between the F-line and the C-line. When glass with a large partial dispersion ratio $\Theta g, F$ is used for a positive lens, the displacement of the focusing position for the g-line beyond the focusing position is reduced. Thus, in a low dispersion range in which the conditional expression (7) is satisfied, the focusing position for short wavelengths is effectively brought close to the focusing position for the reference wavelength at a partial dispersion ratio which satisfies the conditional expression (8) to reduce the secondary spectrum. Since such anomalous dispersion characteristics are inadequate out of the ranges defined by the conditional expressions (7) and (8), the secondary spectrum is not corrected sufficiently.

In the zoom lens of Embodiment 2, the effect of correcting the secondary spectrum is enhanced by limiting the conditional expression (7) to the following range:

$$vd>90 \tag{7a}$$

FIG. 43 is a graph showing the relationship between the Abbe number νd and the partial dispersion ratio Θg, F. In FIG. 43, a point A represents a product with the trade name of PBM2 manufactured by Ohara Inc. (νd equal to 36.26 and Θg, F equal to 0.5828). A point B represents a product with the trade name of NSL7 manufactured by Ohara Inc. (νd equal to 60.49 and Θg, F equal to 0.5436). When the line connecting the point A with the point B is defined as a reference line, optical glass distribution is roughly seen such that, in many cases, high dispersion glass with an Abbe number νd of approximately 35 or smaller is positioned over the reference line, low dispersion glass with an Abbe number νd of approximately 35 to 65 is positioned under the reference line, and anomalous dispersion glass is positioned over the reference line at an Abbe number νd of 60 or larger. The use of low dispersion glass positioned over the reference line is effective in correcting the secondary spectrum, and the correction effect is enhanced as it is positioned away from the reference line. If the conditional expression (7) is limited to the range of the conditional expression (7a), glass in a limited range further away from the reference line thereover in FIG. 43 is used to enhance the effect of correcting the secondary spectrum.

The following conditions are satisfied:

$$1.0<f3a/f3<3.0 \tag{9}$$

$$0.3<f3/ft<0.5 \tag{10}$$

where f3$a$ represents a focal length of the positive lens with the largest Abbe number of the positive lenses of the third lens unit L3, f3 a focal length of the third lens unit L3, and ft a focal length of the entire system at the telephoto end.

The conditional expression (9) defines the refractive power of the positive lens with anomalous dispersion forming part of the third lens unit L3. A low refractive power of the positive lens, which causes the value of f3$a$/f3 to exceed the upper limit, is not preferable since the effect of reducing the secondary spectrum by anomalous dispersion is diminished. In the zoom lens of Embodiment 2, the lens made of anomalous dispersion glass needs to have a certain refractive power. A high refractive power, which causes the value of f3$a$/f3 to be less than the lower limit of the conditional-expression (9), is not preferable since extreme spherical aberration occurs on the underfocus side although the effect of reducing the secondary spectrum is enhanced.

The conditional expression (10) defines the refractive power of the third lens unit L3. If the refractive power of the third lens unit L3 is so low as to cause the value of f3/ft to exceed the upper limit, a negative lens with a high refractive power needs to be used for the third lens unit L3 in order to increase the refractive power of the positive lens with anomalous dispersion of the third lens unit L3. The negative lens is made of relatively high dispersion glass for primary achromatism, which is detrimental to correction of the secondary spectrum. Thus, to achieve primary achromatism and enhance the effect of correcting the secondary spectrum in the third lens unit L3, it is preferable that the third lens unit L3 has an increased refractive power to some extent, and in addition, the anomalous dispersion glass included therein has an increased refractive power. These conditions are difficult to satisfy if the value of f3/ft in the conditional expression (10) exceeds the upper limit. On the other hand, if the refractive power is so high as to cause the value of f3/ft to be less than the lower limit, large variations occur in aberration such as spherical aberration and comatic aberration in the third lens unit L3 during zooming to cause difficulty in maintaining favorable performance over the entire zoom range.

More preferably, the numerical values in the conditional expressions (9) and (10) are set as follows:

$$1.2<f3a/f3<2.6 \tag{9a}$$

$$0.33<f3/ft<0.46 \tag{10a}$$

The aperture stop SP is provided on the object side of the third lens unit L3. The following condition is satisfied:

$$1.8<L3a/fw<3.0 \tag{11}$$

where L3$a$ represents a distance on the optical axis from the aperture stop SP to the lens surface on the image side of the positive lens closest to the image among the positive lenses made of a material with an Abbe number larger than 80 in the third lens unit L3, and fw a focal length of the entire system at the wide-angle end.

The conditional expression (11) defines the position of the positive lens with anomalous dispersion forming part of the third lens unit L3 from the aperture stop SP at the wide-angle end zoom position. If the distance of the positive lens from the aperture stop SP is so large as to cause the value of L3$a$/fw to exceed the upper limit, the lens diameter is increased. On the other hand, a small distance of the positive lens from the aperture stop SP, which causes the value of L3$a$/fw to be less than the lower limit, is not preferable since the correction effect of the secondary spectrum of chromatic aberration of magnification is diminished at the wide-angle end zoom position.

More preferably, the numerical values in the conditional expression (11) are set as follows:

$$2.0<L3a/fw<2.9 \tag{11a}$$

The first lens unit L1 and the third lens unit L3 are moved towards the object in zooming from the wide-angle end to the telephoto end. The following condition is satisfied:

$$0.2<(\beta 3t/\beta 3w)/(ft/fw)<0.4 \tag{12}$$

where $\beta 3w$ and $\beta 3t$ represent magnifications of the third lens unit L3 at the wide-angle end and telephoto end, respectively, and fw and ft focal lengths of the entire system at the wide-angle end and telephoto end, respectively.

The conditional expression (12) defines the contribution to variable magnification of the third lens unit L3. If the contribution to variable magnification of the third lens unit L3 is so large as to cause the value of $(\beta 3t/\beta 3w)/(ft/fw)$ to exceed the upper limit, large variations occur in aberration such as spherical aberration, comatic aberration, and astigmatism in the third lens unit during zooming to make it difficult to provide favorable optical performance over the entire zoom range. On the other hand, a small contribution to variable magnification of the third lens unit L3, which causes the value of $(\beta 3t/\beta 3w)/(ft/fw)$ to be less than the lower limit, is not preferable since it is necessary to increase the spacing between the first lens unit L1 and the second lens unit L2 at the telephoto end zoom position to ensure the zoom ratio of the entire system, resulting in an increase in the overall length of the zoom lens.

More preferably, the numerical values in the conditional expression (12) are set as follows:

$$0.23 < (\beta 3t/\beta 3w)/(ft/fw) < 0.35 \quad (12a)$$

The following condition is satisfied:

$$0.4 < |R3c|/f3 < 0.6 \quad (13)$$

where R3c represents a radius of curvature of the cemented lens surface of the positive lens in the cemented lens forming part of the third lens unit L3, and f3 a focal length of the third lens unit L3.

The conditional expression (13) defines the curvature of the cemented lens surface of the cemented lens including the positive lens with anomalous dispersion forming part of the third lens unit L3. If the radius of curvature of the cemented lens surface is so large as to cause the value of $|R3c|/f3$ to exceed the upper limit, that is, when the curvature is too small, the effect of reducing the secondary spectrum by anomalous dispersion is diminished. On the other hand, if the radius of curvature of the cemented lens surface is so small as to cause the value of $|R3c|/f3$ to be less than the lower limit, that is, the curvature is too large, the effect of reducing the secondary spectrum is enhanced, but higher order components of spherical aberration and comatic aberration cannot be ignored even in the cemented lens surface to make the correction difficult.

More preferably, the numerical values in the conditional expression (13) are set as follows:

$$0.42 \, |R3c|/f3 < 0.59 \quad (13a)$$

Next, numerical data in Numerical Examples 6 to 10 are shown. In Embodiment 2, the partial dispersion ratio $\Theta g, F$ is also shown in addition to the refractive index Ni and the Abbe number vi as parameters of an optical material.

NUMERICAL EXAMPLE 6

$f = 1\sim6.76 \quad Fno = 2.45\sim3.39 \quad 2\omega = 74.2°\sim12.8°$

| | | | | |
|---|---|---|---|---|
| R1 = 8.373 | D1 = 0.24 | N1 = 1.846660 | v1 = 23.9 | Θg, F1 = 0.610 |
| R2 = 5.321 | D2 = 0.72 | N2 = 1.603112 | v2 = 60.6 | Θg, F2 = 0.542 |
| R3 = 60.225 | D3 = 0.03 | | | |
| R4 = 6.229 | D4 = 0.43 | N3 = 1.603112 | v3 = 60.6 | Θg, F3 = 0.542 |
| R5 = 19.667 | D5 = Variable | | | |
| R6 = 8.261 | D6 = 0.15 | N4 = 1.772499 | v4 = 49.6 | Θg, F4 = 0.552 |
| R7 = 1.310 | D7 = 0.62 | | | |
| R8 = −7.767 | D8 = 0.12 | N5 = 1.712995 | v5 = 53.9 | Θg, F5 = 0.546 |
| R9 = 2.874 | D9 = 0.18 | | | |
| R10 = 4.280 | D10 = 0.43 | N6 = 1.846660 | v6 = 23.9 | Θg, F6 = 0.610 |
| R11 = −3.407 | D11 = 0.06 | | | |
| R12 = −2.237 | D12 = 0.12 | N7 = 1.882997 | v7 = 40.8 | Θg, F7 = 0.567 |
| R13 = −7.136 | D13 = Variable | | | |
| R14 = Stop | D14 = 0.11 | | | |
| R15 = 1.448 | D15 = 0.54 | N8 = 1.743300 | v8 = 49.3 | Θg, F8 = 0.553 |
| R16 = −22.067 | D16 = 0.54 | N9 = 1.647689 | v9 = 33.8 | Θg, F9 = 0.594 |
| R17 = 1.292 | D17 = 0.19 | | | |
| R18 = 10.762 | D18 = 0.11 | N10 = 1.603420 | v10 = 38.0 | Θg, F10 = 0.584 |
| R19 = 1.382 | D19 = 0.62 | N11 = 1.496999 | v11 = 81.5 | Θg, F11 = 0.538* |
| R20 = −3.599 | D20 = 0.27 | | | |
| R21 = 2.462 | D21 = 0.41 | N12 = 1.433870 | v12 = 95.1 | Θg, F12 = 0.537* |
| R22 = −19.831 | D22 = Variable | | | |
| R23 = 3.293 | D23 = 0.38 | N13 = 1.77249 | v13 = 49.6 | Θg, F13 = 0.552 |
| R24 = −11.26 | D24 = 0.12 | N14 = 1.846660 | v14 = 23.9 | Θg, F14 = 0.61 |
| R25 = 32.531 | D25 = 0.27 | | | |
| R26 = ∞ | D26 = 0.32 | N15 = 1.516330 | v15 = 64.1 | Θg, F15 = 0.535 |
| R27 = ∞ | | | | |

| Variable | Focal length | | |
|---|---|---|---|
| spacing | 1.00 | 2.21 | 6.76 |
| D5 | 0.20 | 2.00 | 4.46 |
| D13 | 2.96 | 1.40 | 0.35 |
| D22 | 0.41 | 1.71 | 3.64 |

Aspheric coefficient

| | | | | | |
|---|---|---|---|---|---|
| R10 | k = −2.36901e+00 | B = 2.48109e−02 | C = −9.68342e−03 | D = 3.45879e−03 | E = −1.21645e−02 |
| R11 | k = 1.26563e+00 | B = 4.66823e−04 | C = −5.96445e−03 | D = −1.03149e−02 | E = −1.44692e−03 |
| R15 | k = −4.68634e−01 | B = −7.76053e−03 | C = 7.44031e−04 | D = 0.00000e+00 | E = 0.00000e+00 |

NUMERICAL EXAMPLE 7

| \multicolumn{6}{c}{f = 1~6.72 Fno = 2.45~3.61 2ω = 74.2°~12.8°} |||||| 
|---|---|---|---|---|---|
| R1 = 8.284 | D1 = 0.24 | N1 = 1.846660 | ν1 = 23.9 | Θg, F1 = 0.610 | |
| R2 = 5.299 | D2 = 0.72 | N2 = 1.603112 | ν2 = 60.6 | Θg, F2 = 0.542 | |
| R3 = 57.734 | D3 = 0.03 | | | | |
| R4 = 6.373 | D4 = 0.43 | N3 = 1.603112 | ν3 = 60.6 | Θg, F3 = 0.542 | |
| R5 = 22.15 | D5 = Variable | | | | |
| R6 = 8.435 | D6 = 0.15 | N4 = 1.772499 | ν4 = 49.6 | Θg, F4 = 0.552 | |
| R7 = 1.290 | D7 = 0.65 | | | | |
| R8 = −6.665 | D8 = 0.12 | N5 = 1.712995 | ν5 = 53.9 | Θg, F5 = 0.546 | |
| R9 = 2.549 | D9 = 0.20 | | | | |
| R10 = 4.066 | D10 = 0.43 | N6 = 1.846660 | ν6 = 23.9 | Θg, F6 = 0.610 | |
| R11 = −3.351 | D11 = 0.06 | | | | |
| R12 = −2.205 | D12 = 0.12 | N7 = 1.88299 | ν7 = 40.8 | Θg, F7 = 0.567 | |
| R13 = −6.318 | D13 = Variable | | | | |
| R14 = Stop | D14 = 0.11 | | | | |
| R15 = 1.472 | D15 = 0.54 | N8 = 1.743300 | ν8 = 49.3 | Θg, F8 = 0.553 | |
| R16 = 42.174 | D16 = 0.54 | N9 = 1.698947 | ν9 = 30.1 | Θg, F9 = 0.603 | |
| R17 = 1.380 | D17 = 0.15 | | | | |
| R18 = 4.552 | D18 = 0.11 | N10 = 1.603420 | ν10 = 38.0 | Θg, F10 = 0.584 | |
| R19 = 1.606 | D19 = 0.62 | N11 = 1.455999 | ν11 = 90.3 | Θg, F11 = 0.534* | |
| R20 = −3.059 | D20 = 0.27 | | | | |
| R21 = 2.754 | D21 = 0.35 | N12 = 1.433870 | ν12 = 95.1 | Θg, F12 = 0.537* | |
| R22 = 26.997 | D22 = Variable | | | | |
| R23 = 2.789 | D23 = 0.38 | N13 = 1.696797 | ν13 = 55.5 | Θg, F13 = 0.543 | |
| R24 = −14.208 | D24 = 0.12 | N14 = 1.728250 | ν14 = 28.5 | Θg, F14 = 0.608 | |
| R25 = 17.535 | D25 = 0.27 | | | | |
| R26 = ∞ | D26 = 0.32 | N15 = 1.516330 | ν15 = 64.1 | Θg, F15 = 0.535 | |
| R27 = ∞ | | | | | |

| Variable | Focal length | | |
|---|---|---|---|
| spacing | 1.00 | 2.14 | 6.72 |
| D5 | 0.20 | 1.95 | 4.50 |
| D13 | 2.85 | 1.48 | 0.51 |
| D22 | 0.44 | 1.74 | 3.67 |

Aspheric coefficient

| | | | | | |
|---|---|---|---|---|---|
| R10 | k = 7.84930e+00 | B = 6.56602e−03 | C = 2.69281e−03 | D = −3.54250e−02 | E = 1.33648e−02 |
| R11 | k = −1.19232e+00 | B = −7.92173e−03 | C = 8.07633e−03 | D = −4.31266e−02 | E = 2.39379e−02 |
| R15 | k = −4.68634e−01 | B = −7.78692e−03 | C = 7.48254e−04 | D = 0.00000e+00 | E = 0.00000e+00 |

NUMERICAL EXAMPLE 8

| \multicolumn{6}{c}{f = 1~6.72 Fno = 2.45~3.61 2ω = 74.2°~12.8°} |||||| 
|---|---|---|---|---|---|
| R1 = 8.284 | D1 = 0.24 | N1 = 1.846660 | ν1 = 23.9 | Θg, F1 = 0.610 | |
| R2 = 5.299 | D2 = 0.72 | N2 = 1.603112 | ν2 = 60.6 | Θg, F2 = 0.542 | |
| R3 = 57.734 | D3 = 0.03 | | | | |
| R4 = 6.373 | D4 = 0.43 | N3 = 1.603112 | ν3 = 60.6 | Θg, F3 = 0.542 | |
| R5 = 22.156 | D5 = Variable | | | | |
| R6 = 8.435 | D6 = 0.15 | N4 = 1.772499 | ν4 = 49.6 | Θg, F4 = 0.552 | |
| R7 = 1.290 | D7 = 0.65 | | | | |
| R8 = −6.665 | D8 = 0.12 | N5 = 1.712995 | ν5 = 53.9 | Θg, F5 = 0.546 | |
| R9 = 2.549 | D9 = 0.20 | | | | |
| R10 = 4.066 | D10 = 0.43 | N6 = 1.846660 | ν6 = 23.9 | Θg, F6 = 0.610 | |
| R11 = −3.351 | D11 = 0.06 | | | | |
| R12 = −2.205 | D12 = 0.12 | N7 = 1.882997 | ν7 = 40.8 | Θg, F7 = 0.567 | |
| R13 = −6.318 | D13 = Variable | | | | |
| R14 = Stop | D14 = 0.11 | | | | |
| R15 = 1.472 | D15 = 0.54 | N8 = 1.743300 | ν8 = 49.3 | Θg, F8 = 0.553 | |
| R16 = 42.174 | D16 = 0.54 | N9 = 1.698947 | ν9 = 30.1 | Θg, F9 = 0.594 | |
| R17 = 1.380 | D17 = 0.15 | | | | |
| R18 = 4.552 | D18 = 0.11 | N10 = 1.603420 | ν10 = 38.0 | Θg, F10 = 0.584 | |
| R19 = 1.606 | D19 = 0.62 | N11 = 1.455999 | ν11 = 90.3 | Θg, F11 = 0.538* | |
| R20 = −3.059 | D20 = 0.27 | | | | |
| R21 = 2.754 | D21 = 0.35 | N12 = 1.433870 | ν12 = 95.1 | Θg, F12 = 0.537* | |
| R22 = 26.997 | D22 = Variable | | | | |
| R23 = 2.789 | D23 = 0.38 | N13 = 1.696797 | ν13 = 55.5 | Θg, F13 = 0.552 | |

-continued

| f = 1~6.72 Fno = 2.45~3.61 2ω = 74.2°~12.8° | | | | |
|---|---|---|---|---|
| R24 = −14.208 | D24 = 0.12 | N14 = 1.728250 | ν14 = 28.5 | Θg, F14 = 0.610 |
| R25 = 17.535 | D25 = 0.27 | | | |
| R26 = ∞ | D26 = 0.32 | N15 = 1.516330 | ν15 = 64.1 | Θg, F15 = 0.535 |
| R27 = ∞ | | | | |

| Variable | Focal length | | |
|---|---|---|---|
| spacing | 1.00 | 2.14 | 6.72 |
| D5 | 0.20 | 1.95 | 4.50 |
| D13 | 2.85 | 1.48 | 0.51 |
| D22 | 0.44 | 1.74 | 3.67 |

| Aspheric coefficient | | | | | |
|---|---|---|---|---|---|
| R10 | k = 7.84930e+00 | B = 6.56602e−03 | C = 2.69281e−03 | D = −3.54250e−02 | E = 1.33648e−02 |
| R11 | k = −1.19232e+00 | B = −7.92173e−03 | C = 8.07633e−03 | D = −4.31266e−02 | E = 2.39379e−02 |
| R15 | k = −4.68634e−01 | B = −7.78692e−03 | C = 7.48254e−04 | D = 0.00000e+00 | E = 0.00000e+00 |

NUMERICAL EXAMPLE 9

| f = 1~6.98 Fno = 2.83~4.29 2ω = 64.4°~10.3° | | | | |
|---|---|---|---|---|
| R2 = 4.268 | D2 = 0.52 | N2 = 1.603112 | ν2 = 60.6 | Θg, F2 = 0.542 |
| R3 = 76.821 | D3 = 0.02 | | | |
| R4 = 5.371 | D4 = 0.32 | N3 = 1.603112 | ν3 = 60.6 | Θg, F3 = 0.542 |
| R5 = 16.265 | D5 = Variable | | | |
| R6 = 4.985 | D6 = 0.12 | N4 = 1.772499 | ν4 = 49.6 | Θg, F4 = 0.552 |
| R7 = 1.032 | D7 = 0.41 | | | |
| R8 = −7.497 | D8 = 0.10 | N5 = 1.712995 | ν5 = 53.9 | Θg, F5 = 0.546 |
| R9 = 2.499 | D9 = 0.11 | | | |
| R10 = 3.293 | D10 = 0.36 | N6 = 1.846660 | ν6 = 23.9 | Θg, F6 = 0.610 |
| R11 = −2.648 | D11 = 0.03 | | | |
| R12 = −1.697 | D12 = 0.10 | N7 = 1.882997 | ν7 = 40.8 | Θg, F7 = 0.567 |
| R13 = −6.832 | D13 = Variable | | | |
| R14 = Stop | D14 = 0.09 | | | |
| R15 = 1.187 | D15 = 0.45 | N8 = 1.743300 | ν8 = 49.3 | Θg, F8 = 0.553 |
| R16 = −18.097 | D16 = 0.45 | N9 = 1.647689 | ν9 = 33.8 | Θg, F9 = 0.594 |
| R17 = 1.033 | D17 = 0.16 | | | |
| R18 = 4.821 | D18 = 0.09 | N10 = 1.620041 | ν10 = 36.3 | Θg, F10 = 0.588 |
| R19 = 1.424 | D19 = 0.52 | N11 = 1.455999 | ν11 = 90.3 | Θg, F11 = 0.534* |
| R20 = −3.144 | D20 = 0.23 | | | |
| R21 = 2.110 | D21 = 0.34 | N12 = 1.433870 | ν12 = 95.1 | Θg, F12 = 0.537* |
| R22 = −13.275 | D22 = Variable | | | |
| R23 = 3.173 | D23 = 0.32 | N13 = 1.772499 | ν13 = 49.6 | Θg, F13 = 0.552 |
| R24 = −8.027 | D24 = 0.10 | N14 = 1.846660 | ν14 = 23.9 | Θg, F14 = 0.610 |
| R25 = 60.072 | D25 = 0.23 | | | |
| R26 = ∞ | D26 = 0.27 | N15 = 1.516330 | ν15 = 64.1 | Θg, F15 = 0.535 |
| R27 = ∞ | | | | |

| Variable | Focal length | | |
|---|---|---|---|
| spacing | 1.00 | 2.03 | 6.98 |
| D5 | 0.17 | 1.60 | 3.90 |
| D13 | 2.27 | 1.25 | 0.29 |
| D22 | 0.69 | 1.69 | 3.29 |

| Aspheric coefficient | | | | | |
|---|---|---|---|---|---|
| R10 | k = −1.93131e+01 | B = 5.98657e−02 | C = −5.06889e−02 | D = −1.65751e−01 | E = −4.12139e−02 |
| R11 | k = 2.59883e+00 | B = −3.36767e−02 | C = −1.31189e−02 | D = −2.03192e−01 | E = 5.42095e−02 |
| R15 | k = −4.68634e−01 | B = −1.34349e−02 | C = 1.85707e−03 | D = 0.00000e+00 | E = 0.00000e+00 |

NUMERICAL EXAMPLE 10 f = 1~6.73  Fno = 2.45~3.37  2 ω = 74.2°~12.8°

| | | | | |
|---|---|---|---|---|
| R1 = 8.901   | D1 = 0.24      | N1 = 1.846660  | ν1 = 23.9   | Θg, F1 = 0.610 |
| R2 = 5.482   | D2 = 0.72      | N2 = 1.603112  | ν2 = 60.6   | Θg, F2 = 0.542 |
| R3 = 78.169  | D3 = 0.03      |                |             |                |
| R4 = 6.265   | D4 = 0.43      | N3 = 1.603112  | ν3 = 60.6   | Θg, F3 = 0.542 |
| R5 = 20.239  | D5 = Variable  |                |             |                |
| R6 = 8.498   | D6 = 0.15      | N4 = 1.772499  | ν4 = 49.6   | Θg, F4 = 0.552 |
| R7 = 1.322   | D7 = 0.58      |                |             |                |
| R8 = −14.403 | D8 = 0.12      | N5 = 1.712995  | ν5 = 53.9   | Θg, F5 = 0.546 |
| R9 = 2.823   | D9 = 0.15      |                |             |                |
| R10 = 4.397  | D10 = 0.43     | N6 = 1.846660  | ν6 = 23.9   | Θg, F6 = 0.610 |
| R11 = −3.570 | D11 = 0.07     |                |             |                |
| R12 = −2.099 | D12 = 0.12     | N7 = 1.882997  | ν7 = 40.8   | Θg, F7 = 0.567 |
| R13 = −6.241 | D13 = Variable |                |             |                |
| R14 = Stop   | D14 = 0.11     |                |             |                |
| R15 = 1.457  | D15 = 0.54     | N8 = 1.743300  | ν8 = 49.3   | Θg, F8 = 0.553 |
| R16 = 38.450 | D16 = 0.54     | N9 = 1.647689  | ν9 = 33.8   | Θg, F9 = 0.594 |
| R17 = 1.354  | D17 = 0.19     |                |             |                |
| R18 = 7.487  | D18 = 0.11     | N10 = 1.603420 | ν10 = 38.0  | Θg, F10 = 0.584 |
| R19 = 1.400  | D19 = 0.62     | N11 = 1.438750 | ν11 = 95.0  | Θg, F11 = 0.534* |
| R20 = −3.120 | D20 = 0.27     |                |             |                |
| R21 = 2.491  | D21 = 0.41     | N12 = 1.487490 | ν12 = 70.2  | Θg, F12 = 0.530 |
| R22 = −72.068| D22 = Variable |                |             |                |
| R23 = 3.504  | D23 = 0.38     | N13 = 1.772499 | ν13 = 49.6  | Θg, F13 = 0.552 |
| R24 = −6.057 | D24 = 0.12     | N14 = 1.846660 | ν14 = 23.9  | Θg, F14 = 0.610 |
| R25 = 51.349 | D25 = 0.27     |                |             |                |
| R26 = ∞      | D26 = 0.32     | N15 = 1.516330 | ν15 = 64.1  | Θg, F15 = 0.535 |
| R27 = ∞      |                |                |             |                |

| Variable spacing | Focal length | | |
|---|---|---|---|
|  | 1.00 | 2.24 | 6.73 |
| D5  | 0.20 | 2.06 | 4.53 |
| D13 | 3.06 | 1.45 | 0.40 |
| D22 | 0.28 | 1.59 | 3.51 |

Aspheric coefficient

| | | | | | |
|---|---|---|---|---|---|
| R10 | κ = 3.97923e+00  | B = 1.51786e−02  | C = −1.99898e−02 | D = 2.62113e−03  | E = −7.06732e−03 |
| R11 | κ = −4.91450e−01 | B = −8.91258e−03 | C = −1.67061e−02 | D = −1.27744e−02 | E = 5.98699e−03  |
| R15 | κ = −4.68634e−01 | B = −7.76890e−03 | C = 7.45369e−04  | D = 0.00000e+00  | E = 0.00000e+00  |

TABLE 2

| | Numerical example 7 | Numerical example 8 | Numerical example 9 | Numerical example 10 | Numerical example 11 |
|---|---|---|---|---|---|
| Conditional Expression (7), (8) | 81.5, 0.538 | 90.3, 0.534 | 81.5, 0.538 | 90.3, 0.534 | 95.0, 0534 |
| Conditional Expression (7), (8) | 95.1, 0.537 | 95.1, 0.537 | 95.1, 0.537 | 95.1, 0.537 | — |
| Conditional Expression (9)  | 1.719 | 2.401 | 1.482 | 1.731 | 1.678 |
| Conditional Expression (10) | 0.437 | 0.436 | 0.442 | 0.350 | 0.438 |
| Conditional Expression (11) | 2.788 | 2.686 | 2.788 | 2.322 | 2.111 |
| Conditional Expression (12) | 0.310 | 0.297 | 0.300 | 0.280 | 0.316 |
| Conditional Expression (13) | 0.468 | 0.548 | 0.441 | 0.583 | 0.475 |

(Embodiment of Camera)

Next, description is made for Embodiment of a digital still camera (an image-taking apparatus) which has the zoom lens described in Embodiments 1 and 2 with reference to FIG. 44.

Figure 44A:
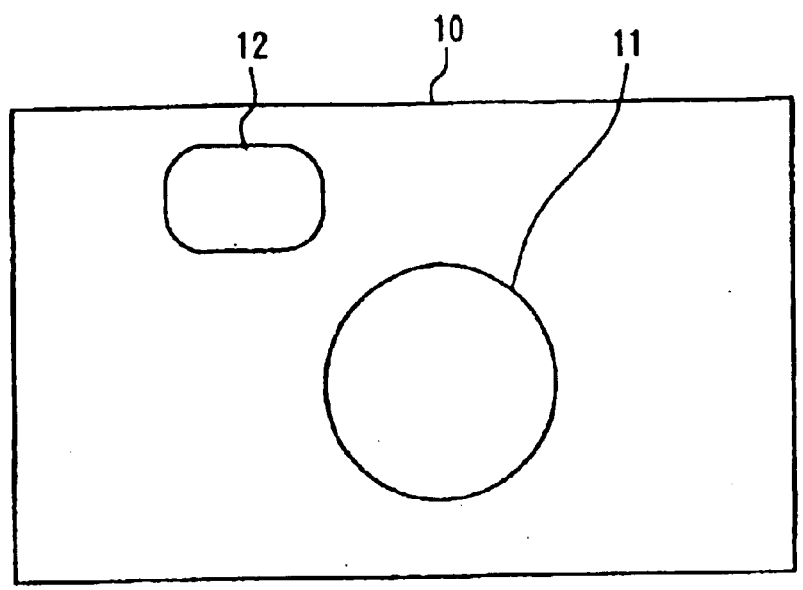
FIG. 44 is a schematic diagram showing main portions of a digital camera having a zoom lens system according to the present invention.
Figure 44B:
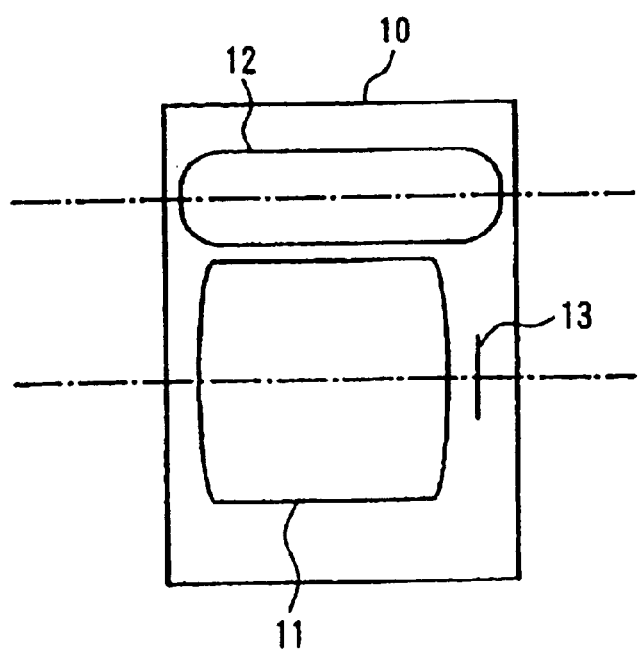

FIG. 44A is a front view of the digital still camera, and FIG. 44B shows a cross section thereof. In FIGS. 44A and 44B, reference numeral 10 shows a camera body (a housing), 11 an image-taking optical system which employs any of the zoom lenses of Embodiments 1 and 2, 12 a viewfinder optical system, and 13 a solid-state image-pickup device (a photoelectrical conversion element) such as a CCD sensor or a CMOS sensor. The solid-state image-pickup device 13 receives an image of an object formed by the image-taking optical system 11 and converts it into electric information. The image information of the object converted into electric information is recorded in a storing section, not shown.

The zoom lenses described in Embodiments 1 and 2 can be applied to the image-taking optical system of the digital still camera to realize a compact image-taking apparatus.

While preferred embodiments have been described, it is to be understood that modification and variation of the present invention may be made without departing from scope of the following claims.

What is claimed is:

1. A zoom lens system comprising in order from an object side to an image side:

a first lens unit with a positive optical power, the first lens unit having at least one positive lens element and at least one negative lens element;

a second lens unit with a negative optical power;

a third lens unit with a positive optical power, the third lens unit consisting of a first lens sub-unit with a positive optical power and a second lens sub-unit with a positive optical power disposed with the largest spacing between them, the first lens sub-unit having at least two positive lens elements; and a fourth lens unit with a positive optical power, wherein a spacing between the first lens unit and the second lens unit is larger at a telephoto end than at a wide-angle end, a spacing between the second lens unit and the third lens unit is smaller at the telephoto end than at the wide-angle end, and a spacing between the third lens unit and the fourth lens unit is larger at the telephoto end than at the wide-angle end, and the following condition is satisfied:

$$(0.6 \times D3b) < d < D3a$$

where D3$a$ represents a distance on an optical axis from a surface closest to an object to a surface closest to an image in the first lens sub-unit, D3$b$ represents a distance on the optical axis from a surface closest to the object to a surface closest to the image in the second lens sub-unit, and d represents the spacing between the first lens sub-unit and the second lens sub-unit.

2. The zoom lens system according to claim 1, wherein the following condition is satisfied:

$$0.7 < f3b/f3a < 1.3$$

where f3$a$ and f3$b$ represent focal lengths of the first lens sub-unit and the second lens sub-unit, respectively.

3. The zoom lens system according to claim 1, wherein the following conditions are satisfied:

$$1.0 < f1/ft < 2.5$$

$$0.01 < d23/ft < 0.20$$

where f1 represents a focal length of the first lens unit L1, ft represents a focal length of the entire system at the telephoto end, and d23 represents a spacing between a surface of the second lens unit closest to the image and the surface of the third lens unit closest to the object at the telephoto end.

4. The zoom lens system according to claim 1, wherein the following condition is satisfied:

$$0.5 < (\beta 3t/\beta 3w)/(\beta 2t/\beta 2w) < 1.0$$

where $\beta 2w$ and $\beta 3w$ represent lateral magnifications of the second lens unit and the third lens unit at the wide-angle end, respectively, and $\beta 2t$ and $\beta 3t$ represent lateral magnifications of the second lens unit and the third lens unit at the telephoto end, respectively.

5. The zoom lens system according to claim 1, wherein the second lens sub-unit consists of a single positive lens element, and the following condition is satisfied:

$$60 < \nu 3b$$

where $\nu 3b$ represents an Abbe number of a material of the single positive lens element.

6. The zoom lens system according to claim 1, wherein the first lens sub-unit consists of two positive lens elements and two negative lens elements.

7. The zoom lens system according to claim 1, wherein the first lens sub-unit consists of, in order from the object side to the image side, a first cemented lens formed by cementing a positive lens element having a convex shape on the object side to a negative lens element having a concave shape on the image side, and a second cemented lens formed by cementing a negative lens element to a positive lens element.

8. The zoom lens system according to claim 1, wherein the second lens sub-unit is moved in focusing.

9. The zoom lens system according to claim 1, further comprising:

an optical filter which is disposed between the first lens sub-unit and the second lens sub-unit.

10. The zoom lens system according to claim 1, wherein the zoom lens system forms an image on a photoelectrical conversion element.

11. A camera comprising:

the zoom lens system according to claim 1; and a photoelectrical conversion element which receives an image formed by the zoom lens system.

12. A zoom lens system comprising, in order from an object side to an image side:

a first lens unit with a positive optical power;

a second lens unit with a negative optical power; and a third lens unit with a positive optical power, wherein a spacing between the first lens unit and the second lens unit is larger at a telephoto end than at a wide-angle end, and a spacing between the second lens unit and the third lens unit is smaller at the telephoto end than at the wide-angle end, and the following conditions are satisfied:

$$\nu d > 90$$

$$\Theta g, F > 0.530$$

where $\nu d$ represents an Abbe number of a material forming at least one positive lens element in the third lens unit and $\Theta g, F$ represents a partial dispersion ratio of the material.

13. The zoom lens system according to claim 12, wherein a material forming all positive lens elements included in the first lens unit is equal to or lower than 80.

14. The zoom lens system according to claim 12, wherein the following conditions are satisfied:

$$1.0 < f3a/f3 < 3.0$$

$$0.3 < f3/ft < 0.5$$

where f3$a$ represents a focal length of a positive lens element formed of a material with the largest Abbe number among positive lens elements included in the third lens unit, f3 represents a focal length of the third lens unit, and ft represents a focal length of the entire system at the telephoto end.

15. The zoom lens system according to claim 12, wherein the third lens unit includes a plurality of positive lens elements, and the following conditions are satisfied:

$$\nu d > 80$$

$$\Theta g, F > 0.530$$

where $\nu d$ represents an Abbe number of a material forming two or more positive lens elements among the plurality of positive lens elements and $\Theta g, F$ represents a partial dispersion ratio of the material.

16. The zoom lens system according to claim 12, further comprising:

an aperture stop which is disposed between the second lens unit and the third lens unit, wherein the following condition is satisfied:

$$1.8 < L3a/fw < 3.0$$

where L3a represents a distance on an optical axis from the aperture stop to a surface on the image side of a positive lens element positioned closest to the image among positive lens elements formed of a material with an Abbe number larger than 80 in the third lens unit, and fw represents a focal length of the entire system at the wide-angle end.

17. The zoom lens system according to claim 12, wherein the following condition is satisfied:

$$0.2 < (\beta 3t/\beta 3w)/(ft/fw) < 0.4$$

where $\beta 3w$ and $\beta 3t$ represent magnifications of the third lens unit at the wide-angle end and telephoto end, respectively, and fw and ft represent focal lengths of the entire system at the wide-angle end and telephoto end, respectively.

18. The zoom lens system according to claim 12, wherein the third lens unit includes two cemented lenses.

19. The zoom lens system according to claim 12, wherein the zoom lens system forms an image on a photoelectrical conversion element.

20. A camera comprising:

the zoom lens system according to claim 12; and a photoelectrical conversion element which receives an image formed by the zoom lens system.

21. A zoom lens system comprising, in order from an object side to an image side:

a first lens unit with a positive optical power;

a second lens unit with a negative optical power;

a third lens unit with a positive optical power; and a fourth lens unit with a positive optical power, wherein the first lens unit is moved towards the object side and the second lens unit is moved along a convex track towards the image side, and the following condition is satisfied:

$$vd > 80$$

$$\Theta g, F > 0.530$$

where vd represents an Abbe number of a material forming at least one positive lens element in the third lens unit and $\Theta g, F$ represents a partial dispersion ratio of the material.

22. The zoom lens system according to claim 21, wherein a material forming all positive lens elements included in the first lens unit is equal to or lower than 80.

23. The zoom lens system according to claim 21, wherein the following conditions are satisfied:

$$1.0 < f3a/f3 < 3.0$$

$$0.3 < f3/ft < 0.5$$

where f3a represents a focal length of a positive lens element formed of a material with the largest Abbe number among positive lens elements included in the third lens unit, f3 represents a focal length of the third lens unit, and ft represents a focal length of the entire system at a telephoto end.

24. The zoom lens system according to claim 21, wherein the third lens unit includes a plurality of positive lens elements, and the following conditions are satisfied:

$$vd > 80$$

$$\Theta g, F > 0.530$$

where vd represents an Abbe number of a material forming two or more positive lens elements among the plurality of positive lens elements and $\Theta g, F$ represents a partial dispersion ratio of the material.

25. The zoom lens system according to claim 21, further comprising:

an aperture stop which is disposed between the second lens unit and the third lens unit, wherein the following condition is satisfied:

$$1.8 < L3a/fw < 3.0$$

where L3a represents a distance on an optical axis from the aperture stop to a surface on the image side of a positive lens element positioned closest to the image among positive lens elements formed of a material with an Abbe number larger than 80 in the third lens unit, and fw represents a focal length of the entire system at a wide-angle end.

26. The zoom lens system according to claim 21, wherein the following condition is satisfied:

$$0.2 < (\beta 3t/\beta 3w)/(ft/fw) < 0.4$$

where $\beta 3w$ and $\beta 3t$ represent magnifications of the third lens unit at the wide-angle end and telephoto end, respectively, and fw and ft represent focal lengths of the entire system at the wide-angle end and telephoto end, respectively.

27. The zoom lens system according to claim 21, wherein the third lens unit includes two cemented lenses.

28. The zoom lens system according to claim 21, wherein the zoom lens system forms an image on a photoelectrical conversion element.

29. A camera comprising:

the zoom lens system according to claim 21; and a photoelectrical conversion element which receives an image formed by the zoom lens system.

30. A zoom lens system comprising, in order from an object side to an image side:

a first lens unit with a positive optical power;

a second lens unit with a negative optical power;

an aperture stop which is moved in zooming;

a third lens unit with a positive optical power; and a fourth lens unit with a positive optical power, wherein a spacing between the first lens unit and the second lens unit is larger at a telephoto end than at a wide-angle end, and a spacing between the second lens unit and the third lens unit is smaller at the telephoto end than at the wide-angle end, and the third lens unit includes a cemented lens formed by cementing a positive lens element to a negative lens element, and the following conditions are satisfied:

$$vd > 80$$

$$\Theta g, F > 0.530$$

where vd represents an Abbe number of a material forming the positive lens element and $\Theta g, F$ represents a partial dispersion ratio of the material.

31. The zoom lens system according to claim 30, wherein the following condition is satisfied:

$$0.4 < |R3c|/f3 < 0.6$$

where R3c represents a radius of curvature of a cemented surface of the cemented lens, and f3 represents a focal length of the third lens unit.

32. The zoom lens system according to claim 30, wherein a material forming all positive lens elements included in the first lens unit is equal to or lower than 80.

33. The zoom lens system according to claim 30, wherein the following conditions are satisfied:

$$1.0 < f3a/f3 < 3.0$$

$$0.3 < f3/ft < 0.5$$

where f3a represents a focal length of a positive lens element formed of a material with the largest Abbe number among positive lens elements included in the third lens unit, f3 represents a focal length of the third lens unit, and ft represents a focal length of the entire system at the telephoto end.

34. The zoom lens system according to claim 30, wherein the third lens unit includes a plurality of positive lens elements, and the following conditions are satisfied:

$$vd > 80$$

$$\Theta g, F > 0.530$$

where vd represents an Abbe number of a material forming two or more positive lens elements among the plurality of positive lens elements and $\Theta g$, F represents a partial dispersion ratio of the material.

35. The zoom lens system according to claim 30, wherein the following condition is satisfied:

$$1.8 < L3a/fw < 3.0$$

where L3a represents a distance on an optical axis from the aperture stop to a surface on the image side of a positive lens element positioned closest to the image among positive lens elements formed of a material with an Abbe number larger than 80 in the third lens unit, and fw represents a focal length of the entire system at a wide-angle end.

36. The zoom lens system according to claim 30, wherein the following condition is satisfied:

$$0.2 < (\beta 3t/\beta 3w)/(ft/fw) < 0.4$$

where β3w and β3t represent magnifications of the third lens unit at the wide-angle end and telephoto end, respectively, and fw and ft represent focal lengths of the entire system at the wide-angle end and telephoto end, respectively.

37. The zoom lens system according to claim 30, wherein the zoom lens system forms an image on a photoelectrical conversion element.

38. A camera comprising:
the zoom lens system according to claim 30; and
a photoelectrical conversion element which receives an image formed by the zoom lens system.

39. A zoom lens system comprising, in order from an object side to an image side:
a first lens unit with a positive optical power;
a second lens unit with a negative optical power; and
a third lens unit with a positive optical power,
wherein a spacing between the first lens and the second lens unit is larger at a telephoto end than at a wide-angle end, and a spacing between the second lens unit and the third lens unit is smaller at the telephoto end than at the wide-angle end, and
the third lens unit includes three positive element, and the following conditions are satisfied:

$$vd > 80$$

$$\Theta g, F > 0.530$$

Where vd represents an Abbe number of a material forming a positive Jens element positioned closer to the image in the third lens unit and $\Theta g$, F represents a partial dispersion ratio of the material.

40. The zoom lens system according to claim 39, wherein a lens element positioned closest to the object in the third lens unit is a positive lens element with meniscus shape, which has a convex surface towards the object side.

41. The zoom lens system according to claim 39, wherein the zoom lens system forms an image on a photoelectrical conversion element.

42. A camera comprising:
a zoom lens system according to claim 39; and
a photoelectrical conversion element which receives an image formed by the zoom lens system.

* * * * *